United States Patent
Bruner et al.

(10) Patent No.: US 9,935,787 B2
(45) Date of Patent: Apr. 3, 2018

(54) TUNNELING VOIP CALL CONTROL ON CELLULAR NETWORKS

(71) Applicant: Microsoft Technology Licensing, LLC, Redmond, WA (US)

(72) Inventors: John D. Bruner, Bellevue, WA (US); Jeffrey Kay, Bellevue, WA (US); Gursharan Sidhu, Seattle, WA (US); Anish Desai, Bellevue, WA (US); Humayun Khan, Issaquah, WA (US); Mansoor Jafry, Kirkland, WA (US); Ray Froelich, Redmond, WA (US); Eric Hamilton, Bothell, WA (US); Eugen Pajor, Kirkland, WA (US); Kerry Woolsey, Duvall, WA (US); Ganapathy Raman, Redmond, WA (US); Krishnan Ananthanarayanan, Redmond, WA (US); Mahendra Sekaran, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 173 days.

(21) Appl. No.: 14/141,025

(22) Filed: Dec. 26, 2013

(65) Prior Publication Data
US 2015/0188727 A1 Jul. 2, 2015

(51) Int. Cl.
*H04L 12/46* (2006.01)
*H04M 7/00* (2006.01)
(Continued)

(52) U.S. Cl.
CPC ...... *H04L 12/4633* (2013.01); *H04L 65/1006* (2013.01); *H04L 65/1053* (2013.01);
(Continued)

(58) Field of Classification Search
CPC ............... H04L 12/4633; H04L 65/403; H04L 65/1053; H04M 7/006; H04M 3/00; H04M 3/42; H04W 76/04
See application file for complete search history.

(56) References Cited

U.S. PATENT DOCUMENTS 6,751,207 B1   6/2004   Lee et al.
6,763,226 B1   7/2004   McZeal, Jr.
(Continued)

FOREIGN PATENT DOCUMENTS

EP    1988697 A1    11/2008
EP    2112849 A2    10/2009
WO    2005055626 A1    6/2005

OTHER PUBLICATIONS

"International Search Report and Written Opinion Issued for PCT Patent Application No. PCT/US2014/066998", dated Feb. 23, 2015, (10 Pages total).

(Continued)

*Primary Examiner* — Michael Thier
*Assistant Examiner* — Kent Krueger
(74) *Attorney, Agent, or Firm* — Mark K. Young; Mayer & Williams PC

(57) ABSTRACT

Signaling from a mobile device is transparently tunneled through a cellular voice network to a Voice over Internet Protocol ("VoIP") core network so that multi-party calls, including conference calls and call waiting, can be managed entirely within the VoIP core network. The tunneled signals enable call control to be implemented in the VoIP core network and also establish a way to communicate requests, instructions, and call state. The signaling is transparent to the cellular network because that network does not receive and interpret the signaling. Instead, the cellular network's existing and unmodified control plane is repurposed by the mobile device by placing new, brief outgoing calls through (Continued)

the cellular network to the VoIP core network where the called party number (i.e., the caller-ID) encodes specific information. The VoIP core network immediately releases the new cellular call once the caller-ID is received and the encoded information is interpreted.

18 Claims, 23 Drawing Sheets

(51) Int. Cl.
    *H04W 76/04*     (2009.01)
    *H04L 29/06*     (2006.01)

(52) U.S. Cl.
    CPC ........ *H04L 65/1069* (2013.01); *H04L 65/403* (2013.01); *H04M 7/006* (2013.01); *H04W 76/04* (2013.01)

(56) References Cited

U.S. PATENT DOCUMENTS

| | | | |
|---|---|---|---|
| 7,010,002 | B2 | 3/2006 | Chow et al. |
| 7,110,750 | B2 | 9/2006 | Oishi et al. |
| 7,529,200 | B2 | 5/2009 | Schmidt et al. |
| 7,706,291 | B2 | 4/2010 | Luft et al. |
| 7,796,998 | B1 | 9/2010 | Zellner et al. |
| 7,830,863 | B2 | 11/2010 | Biage et al. |
| 7,995,565 | B2 | 8/2011 | Buckley et al. |
| 8,155,084 | B2 | 4/2012 | Long et al. |
| 2002/0146000 | A1 | 10/2002 | Jonsson et al. |
| 2004/0047339 | A1 | 3/2004 | Wang et al. |
| 2004/0240430 | A1 | 12/2004 | Lin et al. |
| 2005/0063359 | A1* | 3/2005 | Jagadeesan ....... H04M 3/42314 370/352 |
| 2005/0249196 | A1 | 11/2005 | Ansari et al. |
| 2005/0286466 | A1 | 12/2005 | Tagg et al. |
| 2006/0029049 | A1 | 2/2006 | Kobayashi et al. |
| 2006/0045069 | A1 | 3/2006 | Zehavi et al. |
| 2006/0133582 | A1 | 6/2006 | McCulloch |
| 2006/0187900 | A1 | 6/2006 | Akbar |
| 2006/0198360 | A1 | 9/2006 | Biage et al. |
| 2006/0245413 | A1 | 11/2006 | Skalecki et al. |
| 2006/0291483 | A1 | 12/2006 | Sela |
| 2007/0081518 | A1 | 4/2007 | Jain et al. |
| 2007/0086584 | A1 | 4/2007 | Rossini |
| 2007/0206568 | A1* | 9/2007 | Silver .................. H04L 12/66 370/352 |
| 2007/0263613 | A1 | 11/2007 | Hara et al. |
| 2008/0056235 | A1 | 3/2008 | Albina et al. |
| 2008/0102815 | A1 | 5/2008 | Sengupta et al. |
| 2008/0123625 | A1 | 5/2008 | Buckley |
| 2008/0232352 | A1 | 9/2008 | Terrill et al. |
| 2008/0317011 | A1 | 12/2008 | Datta et al. |
| 2009/0097450 | A1 | 4/2009 | Wallis et al. |
| 2009/0097628 | A1* | 4/2009 | Yap ..................... H04M 3/50 379/202.01 |
| 2010/0080373 | A1 | 4/2010 | Reynolds et al. |
| 2010/0172323 | A1 | 7/2010 | Rexhepi et al. |
| 2010/0273475 | A1 | 10/2010 | Lee et al. |
| 2011/0038362 | A1 | 2/2011 | Vos et al. |
| 2012/0014273 | A1 | 1/2012 | Notton et al. |
| 2012/0120914 | A1 | 5/2012 | Sedlacek et al. |
| 2012/0236868 | A1 | 9/2012 | Yan |
| 2013/0007286 | A1 | 1/2013 | Mehta et al. |
| 2013/0064106 | A1 | 3/2013 | Sylvain |
| 2013/0100887 | A1 | 4/2013 | Kim |

OTHER PUBLICATIONS

"3rd Generation Partnership Project; Technical Specification Group Services and System Aspects; Voice Call Continuity Between CS and IMS Study", In 3rd Generation Partnership Project, Technical Report, vol. 23, Issue V7.7.0, Dec. 1, 2005, pp. 1-153. (154 pages total).

Kalmanek, et al., "A Network-Based Architecture for Seamless Mobility Services", In IEEE Communications Magazine, vol. 44, Issue 6, Jun. 2006 (7 pages total).

Salkintzis, et al., "Voice Call Handover Mechanisms in Next-Generation 3GPP Systems", In IEEE Communications Magazine, vol. 47, Issue 2, pp. 46-56, Feb. 2009 (11 pages total).

"Voice Call Flow Overview", 2007 Cisco Systems, Inc., pp. 1-14, Retrieved from: http://www.cisco.com/en/US/docs/ios/voice/monitor/configuration/guide/vt_callflow_ov.pdf, Retrieved on: Jun. 17, 2013 (14 pages total).

J. Rosenberg, "Interactive Connectivity Establishment (ICE): A Protocol for Network Address Translator (NAT) Traversal for Offer/Answer Protocols", IETF Trust (Apr. 2010), Retrieved from: http://www.rfc-editor.org/rfc/rfc5245.txt, Retrieved on: Sep. 12, 2013 (110 pages total).

M. Baugher, et al., "The Secure Real-time Transport Protocol (SRTP)", The Internet Society (Mar. 2004), Retrieved from: http://www.rfc-editor.org/rfc/rfc3711.txt, Retrieved on: Sep. 12, 2013 (53 pages total).

J. Rosenberg, et al., "SIP: Session Initiation Protocol", The Internet Society (Jun. 2002), Retrieved from: http://www.rfc-editor.org/rfc/rfc3261.txt, Retrieved on: Sep. 12, 2013 (252 pages total).

H. Schulzrinne, et al., "RTP: A Transport Protocol for Real-Time Applications", The Internet Society (Jul. 2003), Retrieved from: http://www.rfc-editor.org/rfc/rfc3550.txt, Retrieved on: Sep. 12, 2013 (98 pages total).

Bryan, et al., "SOSIMPLE: A SIP/SIMPLE Based P2P VoIP and IM System," Computer Science Department, College a of William and Mary, Williamsburg, VA, Retrieved from: http://www.enseirb.fr/~kadionik/sip/paper, Retrieved Date: Sep. 16, 2013 (6 pages total).

Rauhala, J., "Universal SIP client for consumer devices," Helsinki University of Technology, Department of Electrical Communications Engineering, Thesis submitted May 13, 2003, Retrieved from: http://scholar.google.com/url?sa=U&q=http://antoine.fressancourt.free.fr/exjobb/BX_Universal, Retrieved Date: Sep. 16, 2013 (64 pages total).

Santos, et al., "Deployment of a Wireless Hybrid and Mobile Network for VoIP Services Based on Open Source Software," Universidade Federal de Campina Grande, Retrieved From: http://www.inf.int-evty.fr/~olberger/wfs2006/danilo, Retrieved Date: Sep. 16, 2013 (20 pages total).

"Wireless Features Description: Three-Way Calling", Published on: Jun. 2007, Available at: http://www.3gpp2.org/Public_html/specs/S.R0006-522-A_v1.0_070624.pdf (18 pages total).

"Wireless Features Description: Call Waiting", Published on: Jun. 2007, Available at: http://www.3gpp2.org/Public_html/specs/S.R0006-507-A_v1.0_070624.pdf (16 pages total).

"Wireless Features Description: Conference Calling", Published on: Jun. 2007, Available at: http://www.3gpp2.org/Public_html/specs/S.R0006-510-A_v1.0_070624.pdf (24 pages total).

"Mobile Application Part (MAP)", Published on: Jul. 2007, Available at: http://www.3gpp2.org/Public_html/specs/X.S0004-000-E_v6.0_070723.pdf (109 pages total).

\* cited by examiner

TUNNELING VOIP CALL CONTROL ON CELLULAR NETWORKS

BACKGROUND

Mobile devices are leveraging new communication services that are traditionally associated with cellular systems which are being provided over several different media, including VoIP (Voice over Internet Protocol) over Wi-Fi (under IEEE 802.11), VoIP over cellular packet-switched data networking, and legacy cellular voice. While such new communication services can often provide satisfactory performance, opportunities exist to make them more effective with more comprehensive features and benefits to users.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Signaling from a mobile device (such as a mobile phone or smartphone) is transparently tunneled through a telephony-based access network (such as a cellular voice network) to a VoIP core network so that multi-party calls, including conference calls and call waiting, can be managed entirely within the VoIP core network. The tunneled signals enable call control to be implemented in the VoIP core network and also establish a way to communicate requests, instructions, and call state between the network and the mobile device. The signaling is transparent to the cellular network because that network does not receive and interpret the signaling. Instead, the cellular network's existing and unmodified control plane is repurposed by the mobile device by placing new, brief outgoing calls through the cellular network to the VoIP core network where the called party number (i.e., the caller-ID) encodes specific information. The VoIP core network immediately releases the new cellular call once the caller-ID is received and the encoded information is interpreted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
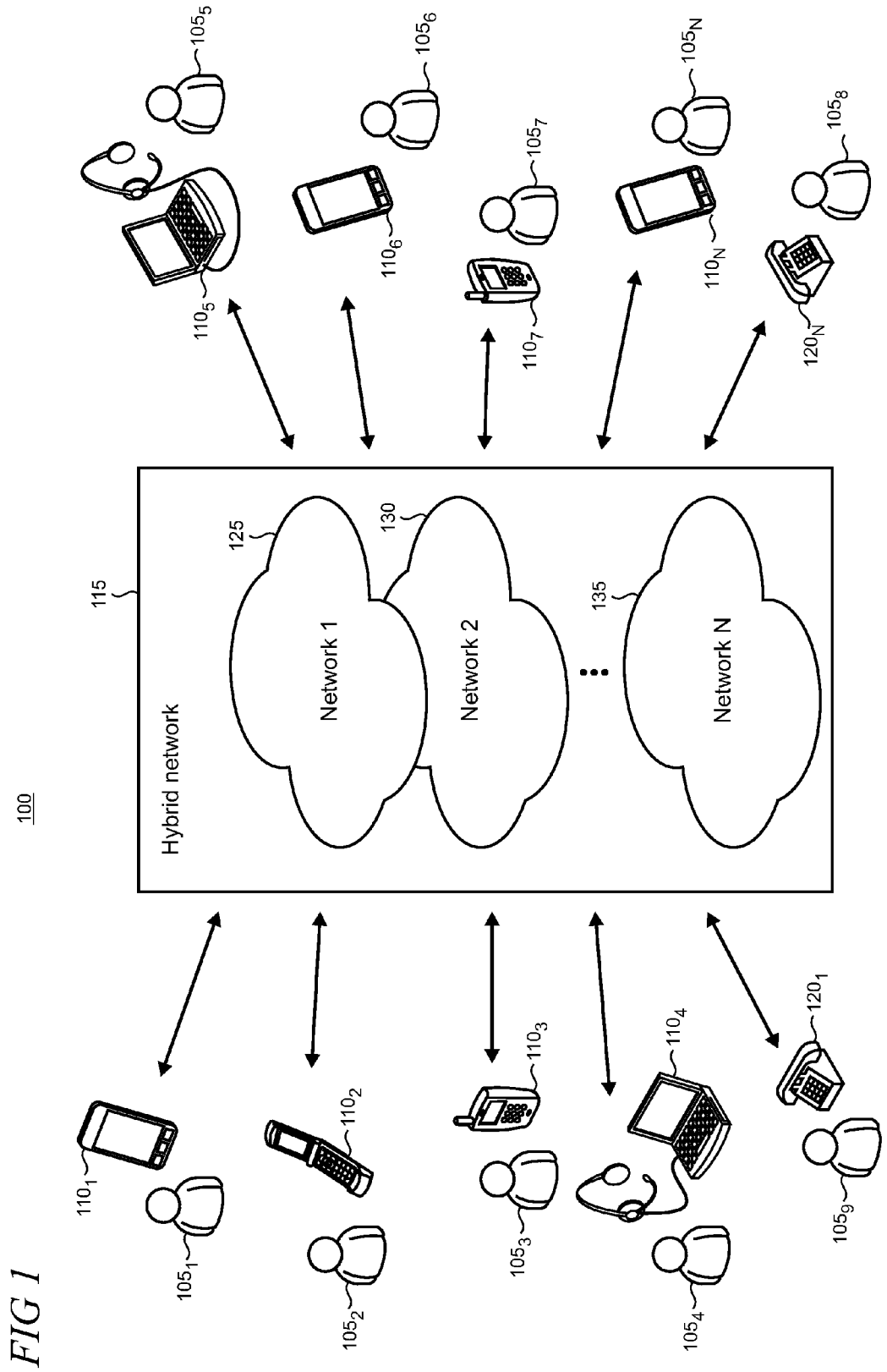
FIG. 1 shows an illustrative telecommunications environment in which devices having telephony capabilities communicate over a hybrid telecommunications network.

FIG. 1 shows an illustrative telecommunications environment 100 in which various users 105 employ respective devices 110 that communicate over a hybrid telecommunications network 115. The devices 110 provide voice telephony capabilities, typically in addition to various other features. The devices 110 may include, for example, user equipment, mobile phones, cell phones, and smartphones which users often employ to make and receive voice and/or multimedia calls. However, alternative types of electronic devices are also envisioned to be usable within the telecommunications environment 100 so long as they are configured with telephony capabilities and can connect to the hybrid network 115, as described in more detail below. Such alternative devices variously include handheld computing devices, PDAs (Personal Digital Assistants), portable media players, wearable computers, navigation devices such as GPS (Global Positioning System) systems, laptop PCs (personal computers) desktop computers, multimedia consoles, gaming systems, or the like. In the discussion that follows, the use of the term "mobile device" is intended to cover all devices that are configured with telephony capabilities and are capable of wireless connectivity to the hybrid network 115.

Other types of telephony equipment may also be present in the telecommunications environment 100 such as conventional desktop phones 120 which are operatively coupled to a public switched telephone network ("PSTN"). Other examples may include equipment that connects to the PSTN using private branch exchanges ("PBXs") and equipment coupled to call services that are accessed using telephone numbers. This other telephony equipment may still be utilized in various scenarios involving VoIP call control tunneling, even though it might not implement VoIP call control tunneling functionality itself. For example, a mobile phone 110 may make or receive a call to a desktop phone 120 and employ voice call continuity as the prevailing connection conditions change such as when the mobile device user moves from a car to home during a call.

The hybrid network 115 comprises several networks 1, 2 ... N, identified in FIG. 1 by reference numerals 125, 130, and 135, respectively. Typically, the various networks will be accessed using different types of wireless connections including Wi-Fi, cellular packet-switched data, or cellular circuit-switched voice connections. Thus, the networks in the hybrid network 115 typically include a VoIP network and a mobile operator ("MO") network which typically includes an access network portion and a core network portion that provides for switching, routing, transport and other functionalities. A PSTN wireline network may also be included as part of the hybrid network in some implementations, as discussed in more detail below.

Each mobile device 110 will typically have a prearranged association with one or more of the networks underlying the hybrid network 115. For example, a user 105 will typically be a subscriber to a cellular telephone service so that the user's mobile device 110 can access a given cellular network as valid and authenticated user equipment. Similarly, the mobile device 110 may include functionality and credentials to access a Wi-Fi network. The mobile devices 110 may also interoperate with a VoIP network (shown below in FIG. 3) and be capable of providing voice call continuity ("VCC") across different connection types according to a prearranged association. Such mobile devices are considered "VCC-equipped" and can make calls over different types of connections including Wi-Fi, cellular voice, and cellular data connections. VCC is discussed in more detail below.

In some situations, a mobile device may be placed in a dock or cradle that is coupled to the PSTN and thus could employ a wireline connection for a call which is often the least expensive network connection. Typically, the mobile devices 110 use the less expensive Wi-Fi connection whenever it is available and capable of providing a reasonable level of call quality. When Wi-Fi is not available or is inadequate for the voice call, the call may be made over one of the other available network connection options after determining that the selected connection will result in acceptable call quality. Cellular voice is the costliest connection alternative but also the most ubiquitous and so it is used to ensure that the user has access to calling services from as wide an area as possible. In the description that follows, the mobile devices 110 are considered to be VCC equipped unless otherwise indicated.

Figure 2:
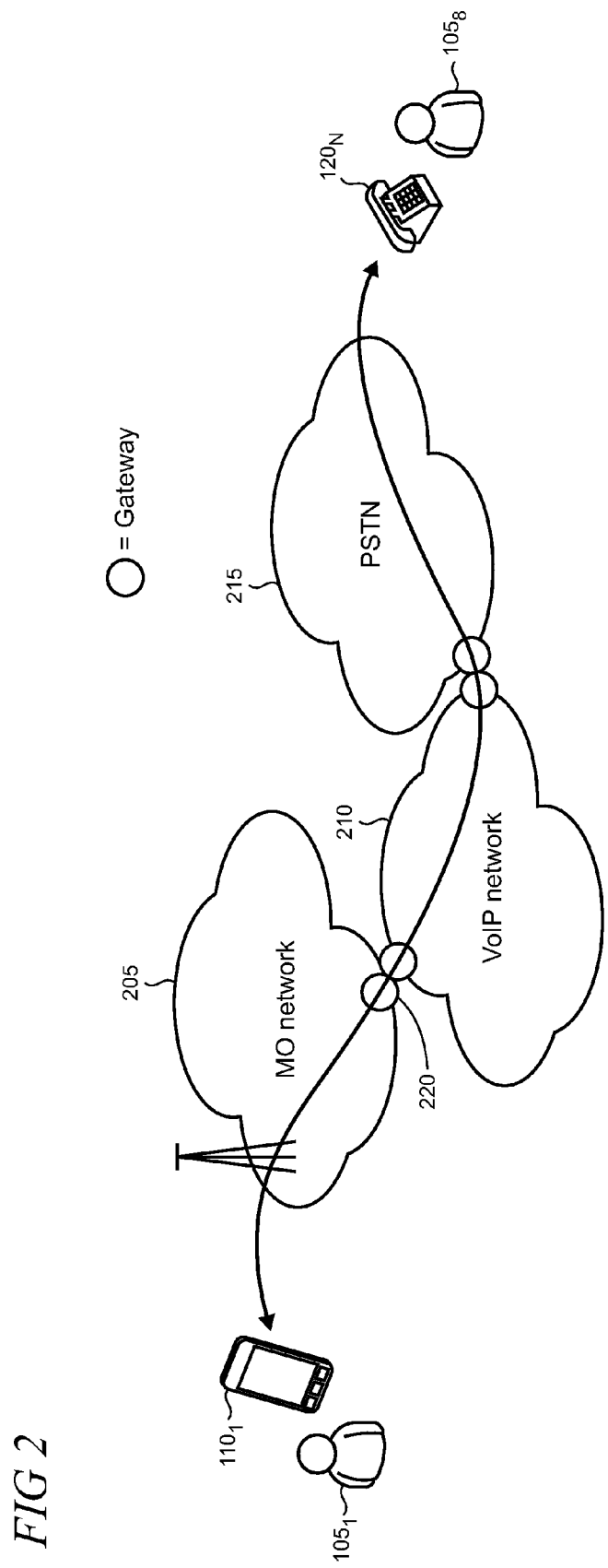
FIG. 2 shows an illustrative example in which a call is carried over multiple types of telecommunications networks.

A characteristic of the hybrid network 115 is that two or more of the underlying networks (e.g., networks 125, 130, 135) are considered loosely coupled. That is, in one illustrative example, the VoIP network and the MO network are typically operated independently so that one network cannot exercise significant or substantial control over the operation of the other. However, as shown in FIG. 2, the underlying networks, while loosely coupled, are still interoperable so that calls can traverse an MO network 205, VoIP network 210, and PSTN 215. Such interoperability is commonly facilitated using gateways, as representatively indicated by reference numeral 220. It is becoming increasingly common for significant portions of a given call to be transported over the VoIP network 210 because such networks can often provide very high quality transportation at the lowest cost to the network operators. In such cases, the MO network 205 and the PSTN network 215 essentially function as access networks to the mobile device at each end of the call while the VoIP network 210 performs the bulk of the routing and transport for the call. Other access networks may also be utilized in order for a call to reach the VoIP network 210 including both cellular circuit-switched and packet-switched networks, and Wi-Fi access points such as public Wi-Fi "hotspots" and those provided by home and office Internet Service Providers ("ISPs").

While such hybridization can provide cost-effective and high quality transport, the loose coupling has traditionally presented difficulties for voice call continuity. Voice call continuity functionality is defined here as the maintenance of ongoing voice calls for a device that is capable of placing and receiving voice calls in the face of changes in prevailing connection conditions perhaps due to user mobility or other environmental factors. For example, the connection currently being used, such as Wi-Fi under IEEE (Institute of Electrical and Electronic Engineers) 802.11 could start demonstrating worsening radio signal and/or network congestion conditions, or the user could move to a location where the Wi-Fi connection does not work at all. In addition, other connection options may become available that are lower cost, or provide a better user experience, and therefore either or both the user and network operator may wish to utilize such connection options.

Figure 3:
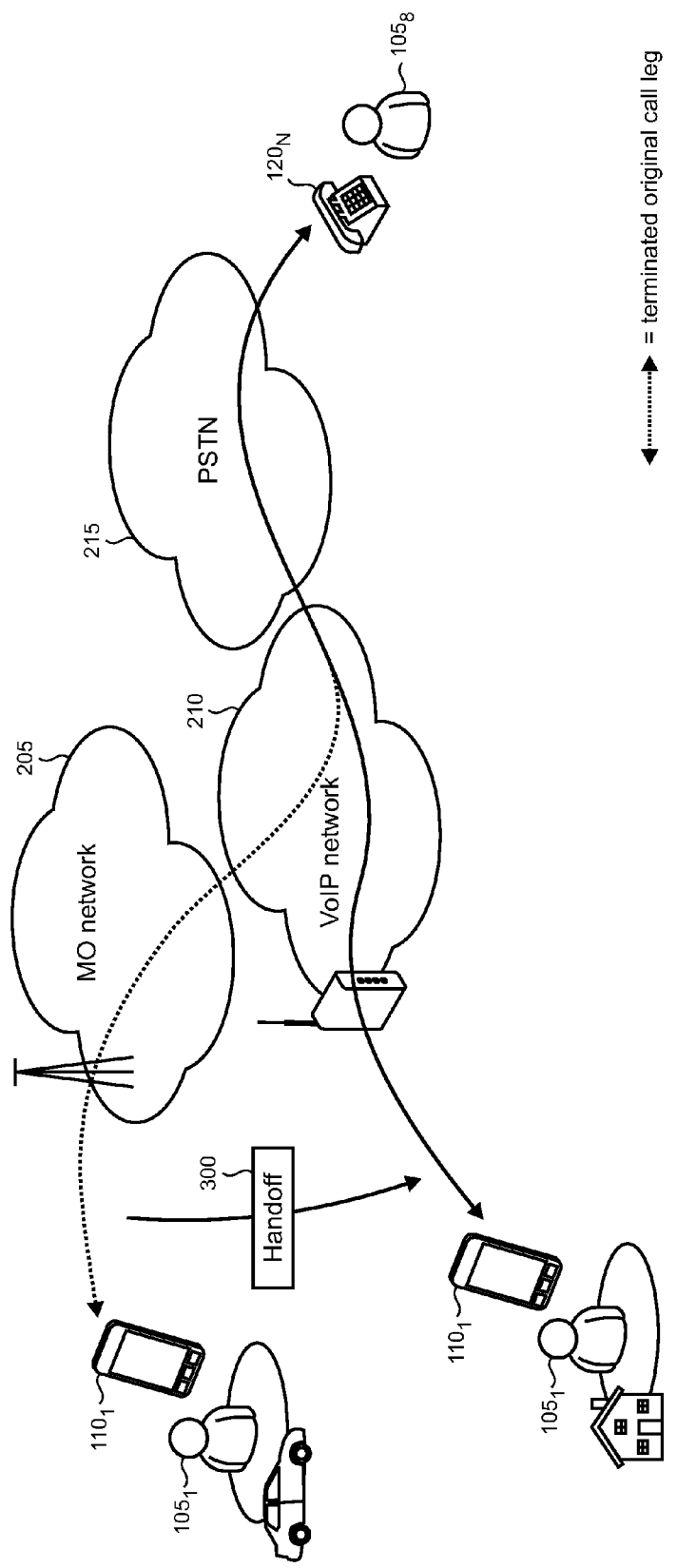
FIG. 3 shows an illustrative example in which a call is handed off between two different networks.

For example, as shown in FIG. 3, a user 105 may be in the car when initiating a call over the MO network 205. When the user 105 returns home, another call leg is then created over a selected connection which in this example is the home Wi-Fi connection to the VoIP network 210. The selected connection is associated with the call, preferably while the original call is still ongoing (in what is termed a "make-before-break" handoff). When the new call leg is stable, the original call leg is removed from the call and the handoff 300 to the new connection is complete.

If the handoff is initiated so that both the original and newly selected connections are operative simultaneously then there will be an intermediate state in which both call legs will be running in parallel. Media flows can be directed to and from the mobile device over these parallel connections, until one of the two flows is terminated. Such intermediate state enables the call to be maintained in an uninterrupted manner as perceived by the parties on both ends of the call. During the intermediate state, the mobile device can typically choose to connect to one of the two flows as it deems appropriate.

Figure 4:
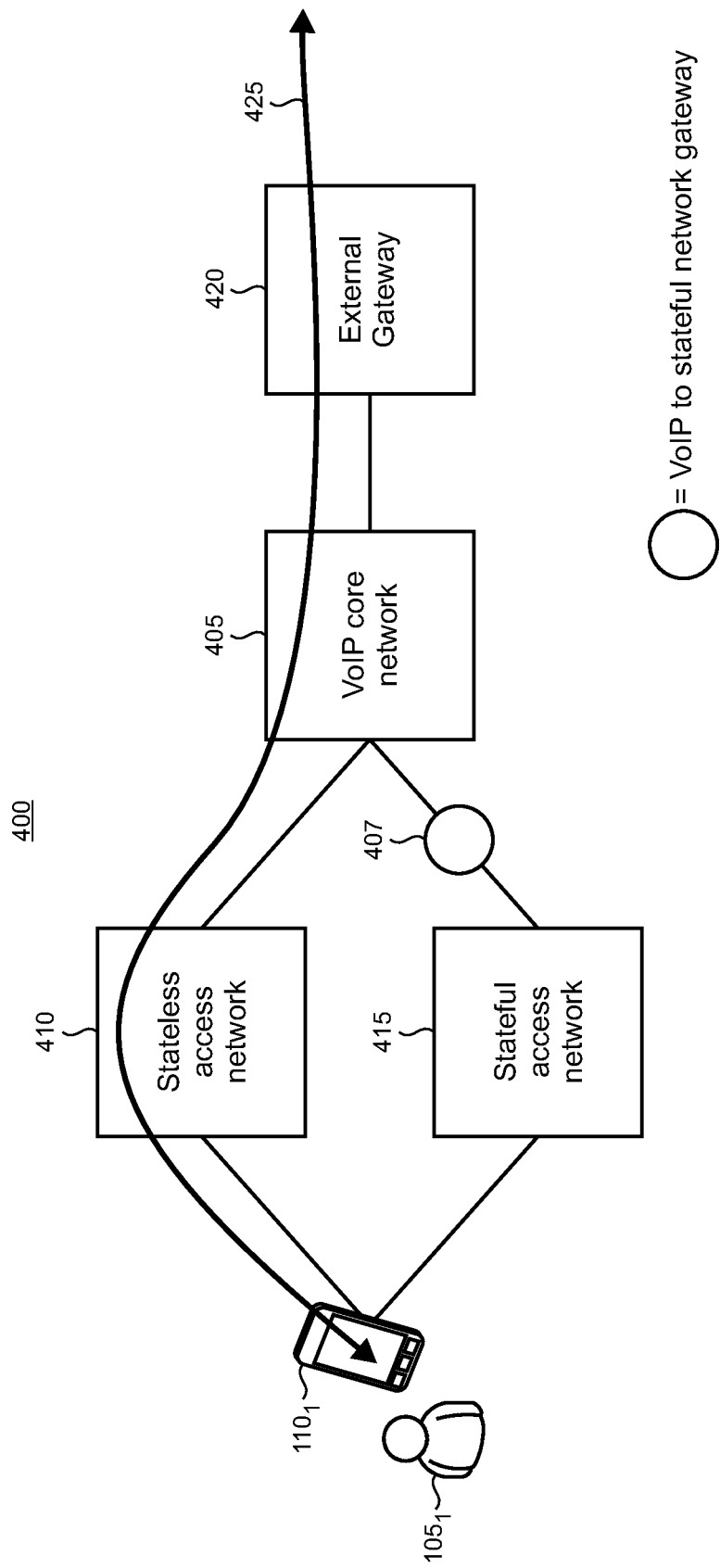
FIGS. 4-7 show illustrative call handling in a hybrid telecommunications network.

FIG. 4 depicts a generalized form of a hybrid network 400. A VoIP core network 405 is operatively connected to a stateless access network 410 and to a stateful access network 415 using a VoIP to stateful network gateway 407. The connections between the VoIP core network 405 and the access networks 410 and 415 may be implemented using well-defined interfaces such as a SIP-based (Session Initiation Protocol) session border controllers, for example. The stateless access network 410 is arranged to directly carry VoIP calls over IP while the stateful access network 415 employs telephony-based protocols. A cellular voice network is a typical example of a stateful access network. The VoIP core network 405 is further operatively coupled to an external gateway 420 to enable the mobile device 110 to make and receive VoIP calls (indicated by reference numeral 425) to a remote party (not shown) over the stateless access network 410.

Figure 5:
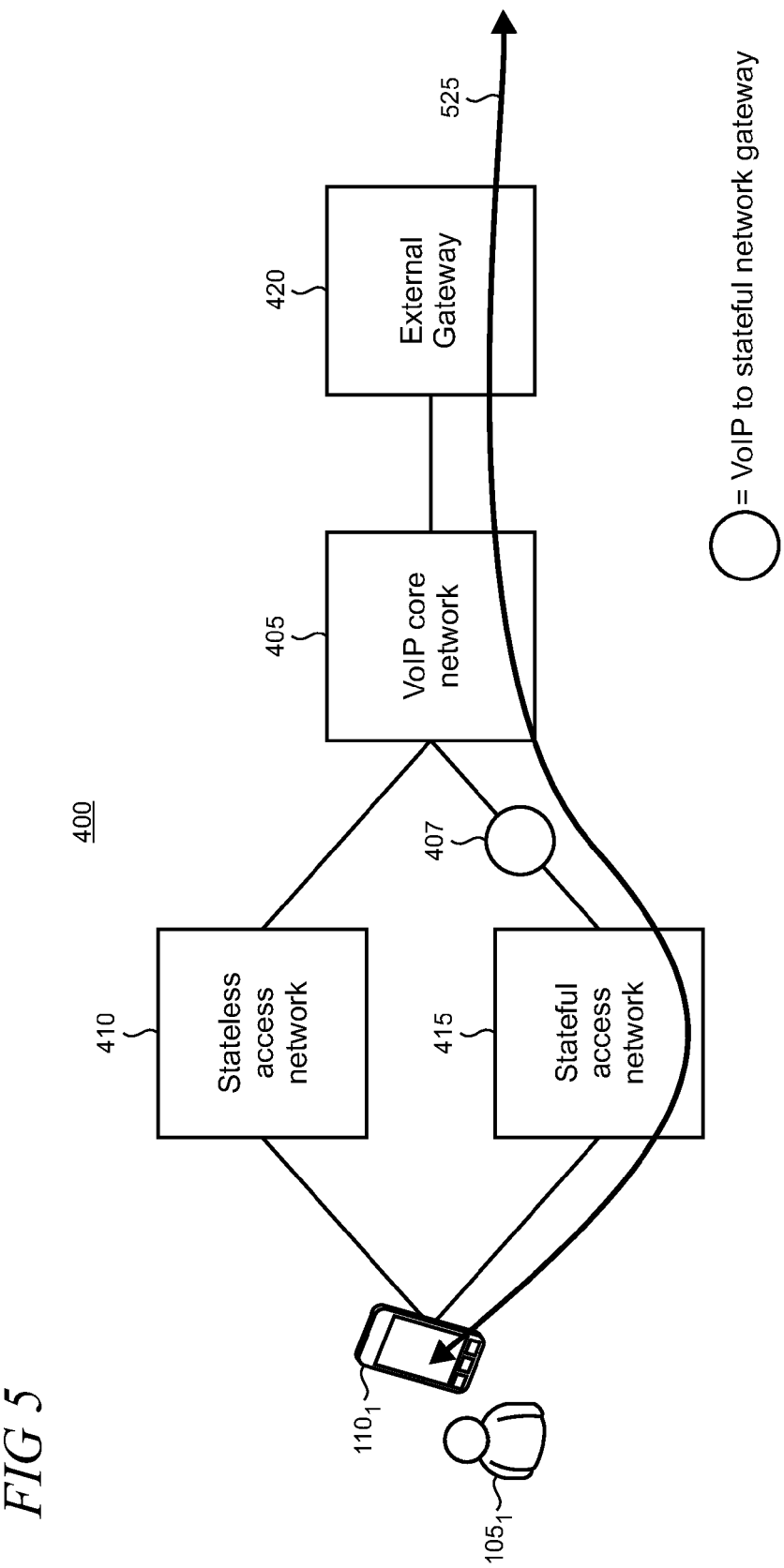

FIG. 5 shows a call 525 being originated from a mobile device 110 on the stateful access network 415. The call 525 is routed through the interface 407 (e.g., a session border controller) to the VoIP core network 405 which inspects the called telephone number and routes the call as appropriate to the gateway to the remote party.

The present tunneling VoIP call control may be applied in the handling of calls between a mobile device 110 and multiple remote parties at the same time. Without loss of generality, two of the most common examples involving multiple remote parties include call waiting and conference calling, for example, three-way calling. In the case of call waiting, mobile device 110 may be engaged in a call when a second call comes in. The user 105 may choose to answer the waiting call while placing the first call on hold, periodically swap between calls, and eventually end one or both calls. In the case of conference calling such as three-way calling, the user 105 may place a call to two different remote parties and then join them into a single conference call.

Cellular networks provide direct support for swapping between active and held calls and for managing conference calls using standards-defined signaling between the mobile device and the cellular network. The state of the multiple calls is managed by the cellular operator within a functional component of its own network. In a standard cellular deployment, the central point of control is the cellular operator and this solution performs well in many implementations.

Figure 6:
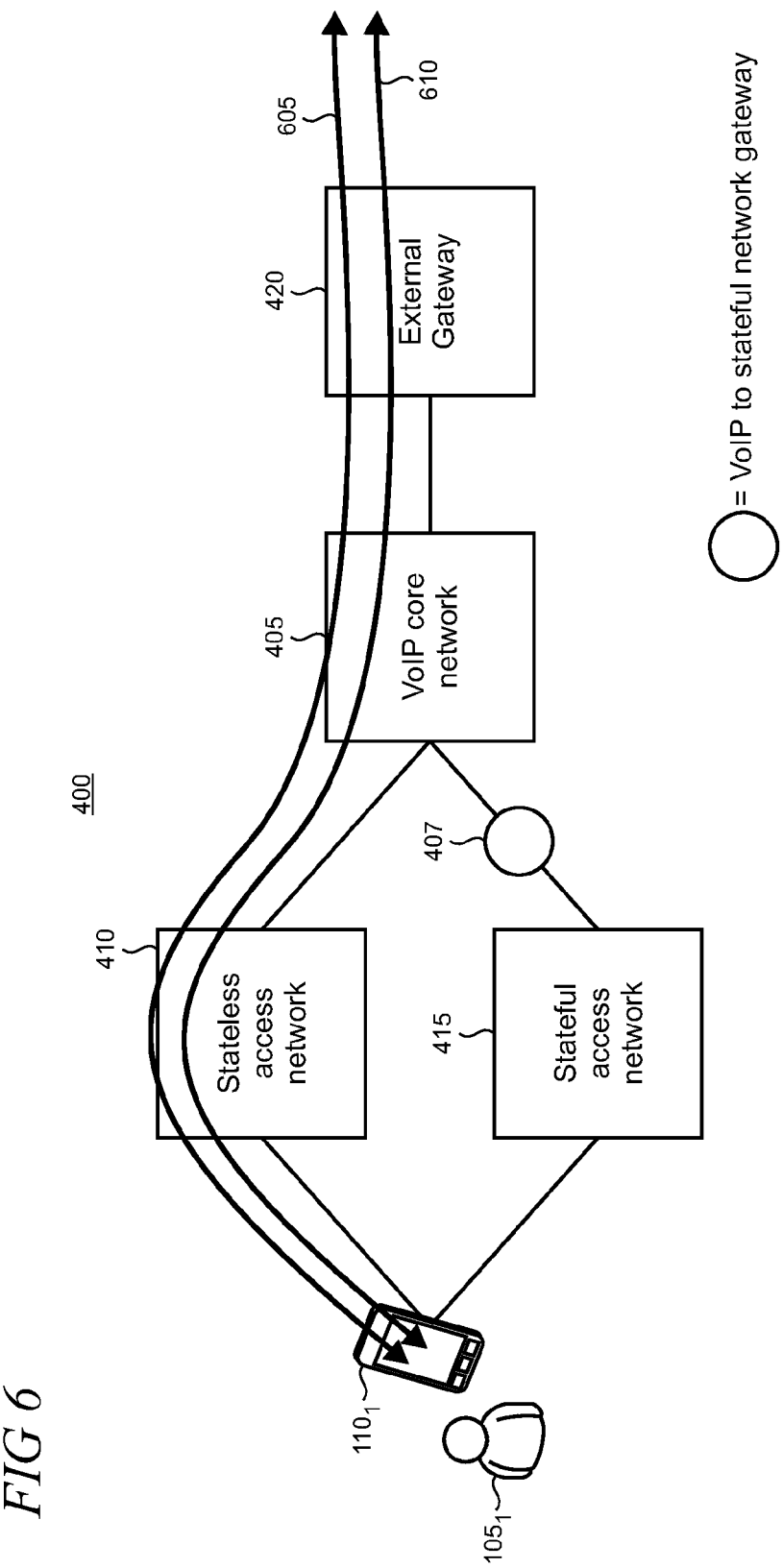

When a call is provided by a VoIP service provider over an IP access network, the state of active, held, and multi-party calls is managed exclusively by the VoIP service and retained in the VoIP core network 405. As shown in FIG. 6, an active call 605 and a waiting call 610 are separate flows end-to-end through the hybrid network 400. The stateless access network 410 provides a transparent communications path between the mobile device 110 and the service supported on the VoIP core network 405.

Figure 7:
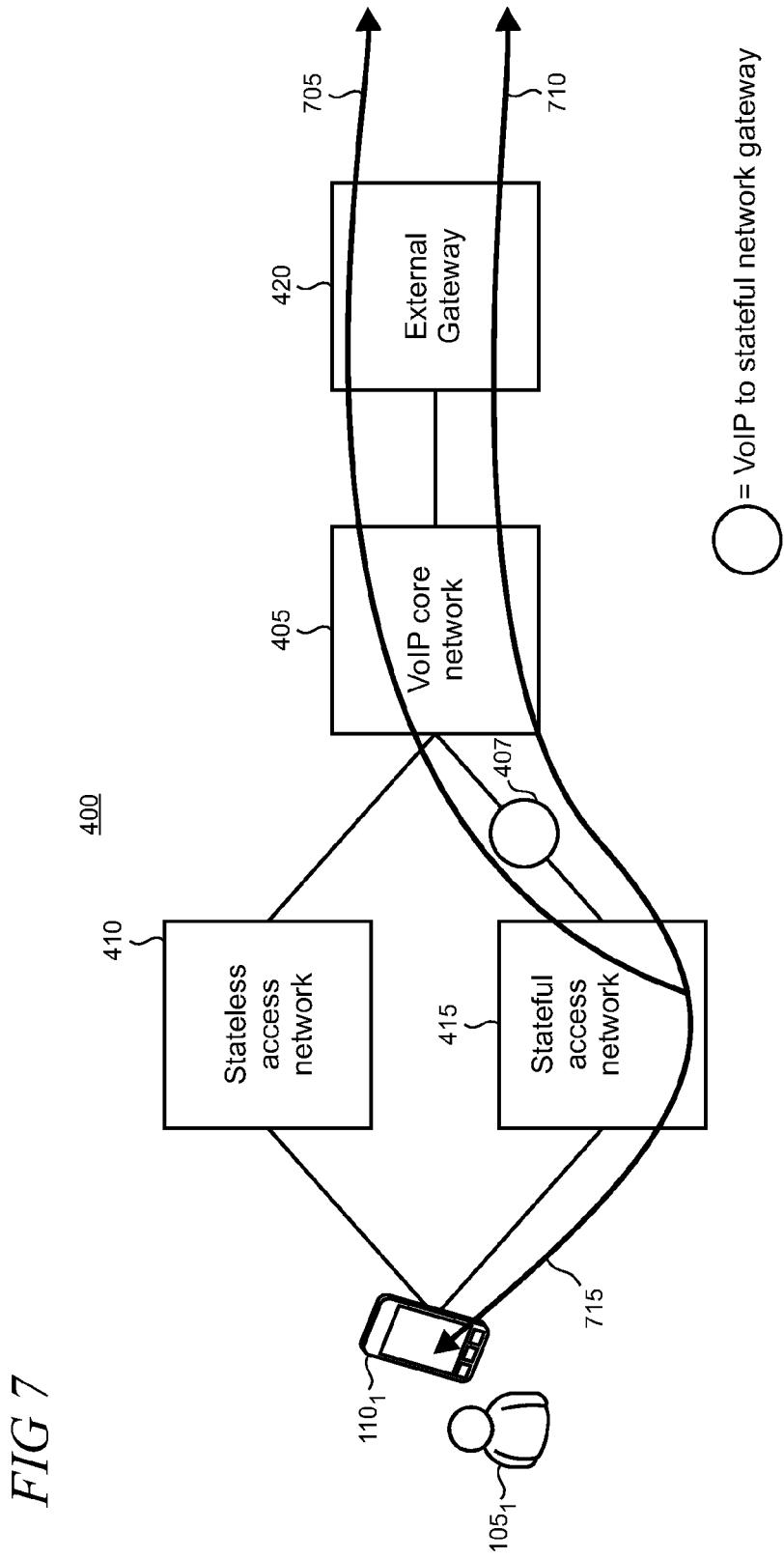

When a call is provided by a VoIP service but the mobile device 110 is connected to the VoIP core network through the stateful access network 415, such as a cellular voice network, the stateful network 415 provides telephony services rather than packet services, and the VoIP core network 405 needs to interact with the stateful access network and its internal model for single- and multi-party calls. In the case of multi-party calling, the stateful access network 415 typically attempts to manage the multiple calls within its own infrastructure which is completely invisible to the VoIP core network 405. For example, as shown in FIG. 7, the stateful access network 415 can manage call waiting just as it would in a standard cellular network (i.e., a non-hybrid network). In such a case, two calls flow into the stateful access network 415, as indicated by reference numerals 705 and 710, but only one flow 715 reaches the mobile device 110. The VoIP core network 405 does not communicate directly with the mobile device 110 and has no visibility into the state of the two calls.

This hidden state interferes with call management by the VoIP core network, including VCC as the VoIP core network 405 does not know which calls are being held or conferenced. Therefore, the VoIP core network 405 cannot replicate the aggregate state of all calls to the mobile device when switching to a different access network, for example, Wi-Fi, during a handoff. The present tunneling VoIP call control bypasses the stateful access network's multi-party call handling in order to establish a direct path (i.e., a "tunnel") of communications between the VoIP core network 405 and the mobile device 110 so that multi-party calls are managed solely by the VoIP core network.

Figure 8:
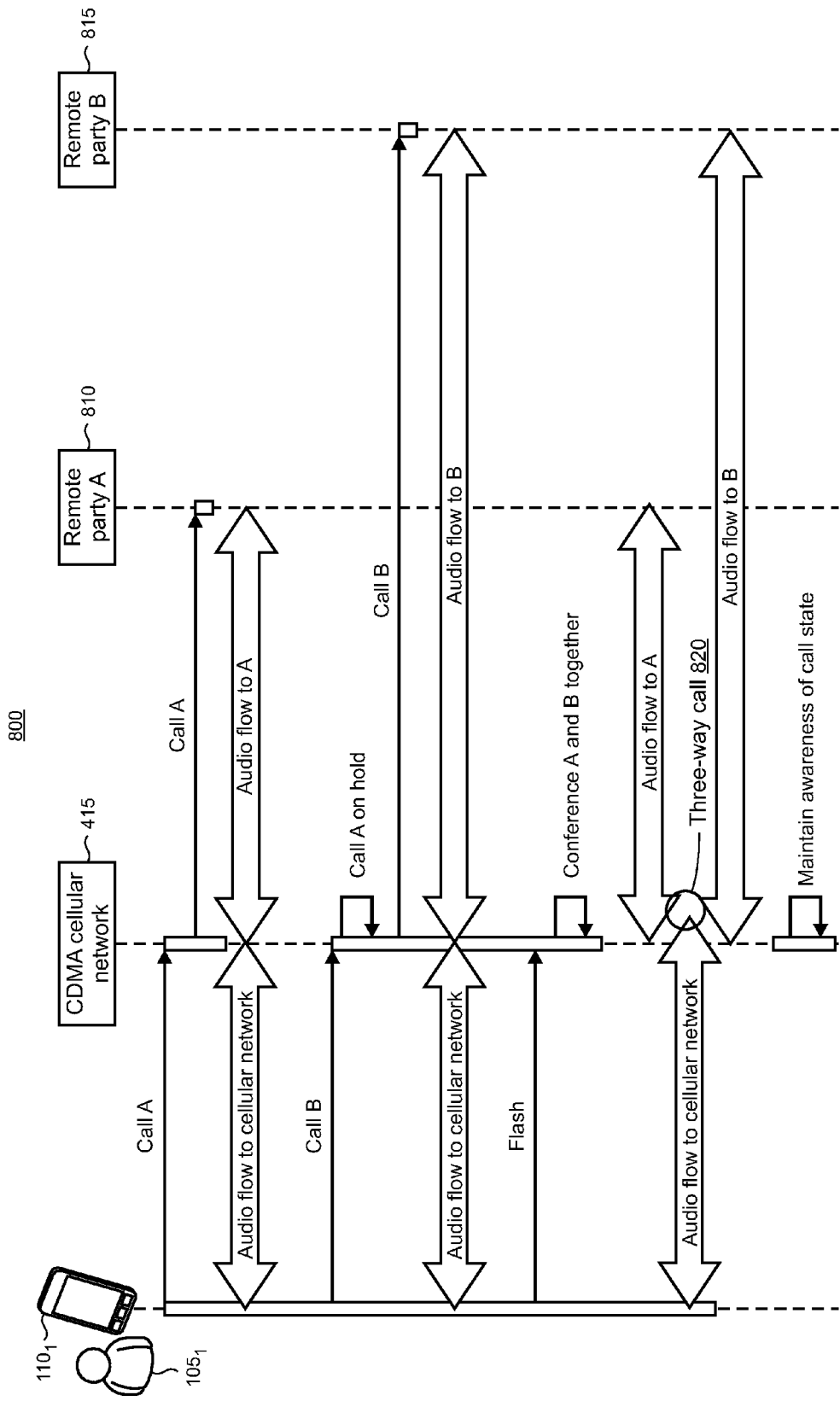
FIGS. 8 and 9 illustrate handling of a three-way call in a cellular network.
Figure 9:
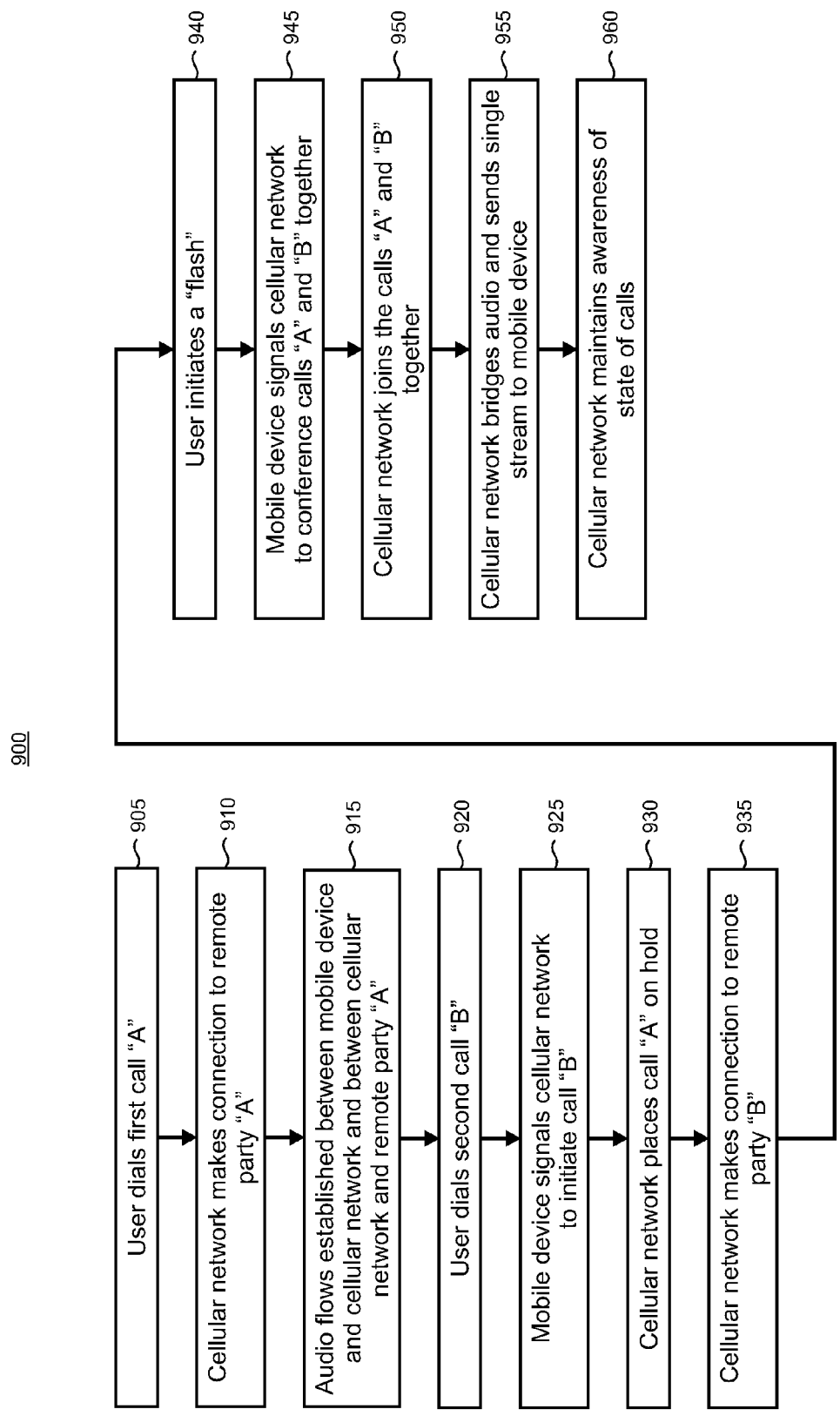

FIG. 8 shows a call flow diagram 800 for an illustrative call flow in which a conventional CDMA (Code Division Multiple Access) cellular network 415 is utilized for a typical three-way calling scenario. FIG. 9 is flowchart of a method 900 that corresponds to the diagram 800. The reader may wish to refer to FIG. 8 as the discussion of the method in FIG. 9 is presented below. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In step 905 of the method, the user 105 of the mobile device 110 dials the first call "A" to remote party "A" 810. The cellular network 415 makes the connection to the remote party "A" in step 910 and establishes the audio flow in step 915. The user 105 dials the second call to the second remote party "B" 815 in step 920. The mobile device 110 signals the cellular network 415 to originate a call to the second remote party "B" in step 925. The cellular network places call "A" on hold in step 930 and makes a connection to the remote party "B" in step 935.

The user 105 initiates a flash or similar operation on the mobile device 110 in order to indicate that the first and second calls "A" and "B" are desired to be conferenced together in step 940. The mobile device 110 signals the cellular network 415 to conference the calls together in step 945. The cellular network joins calls "A" and "B" in step 950 and bridges the audio into a single stream to the mobile device 110 in step 955 to implement the three-way call 820. The cellular network maintains an awareness of the state of both calls "A" and "B" while conferenced in step 960. For example, the cellular network can signal the user by playing an audible tone or providing another indicator at the mobile device 110 if one of the remote parties drops from the three-way call.

Figure 10:
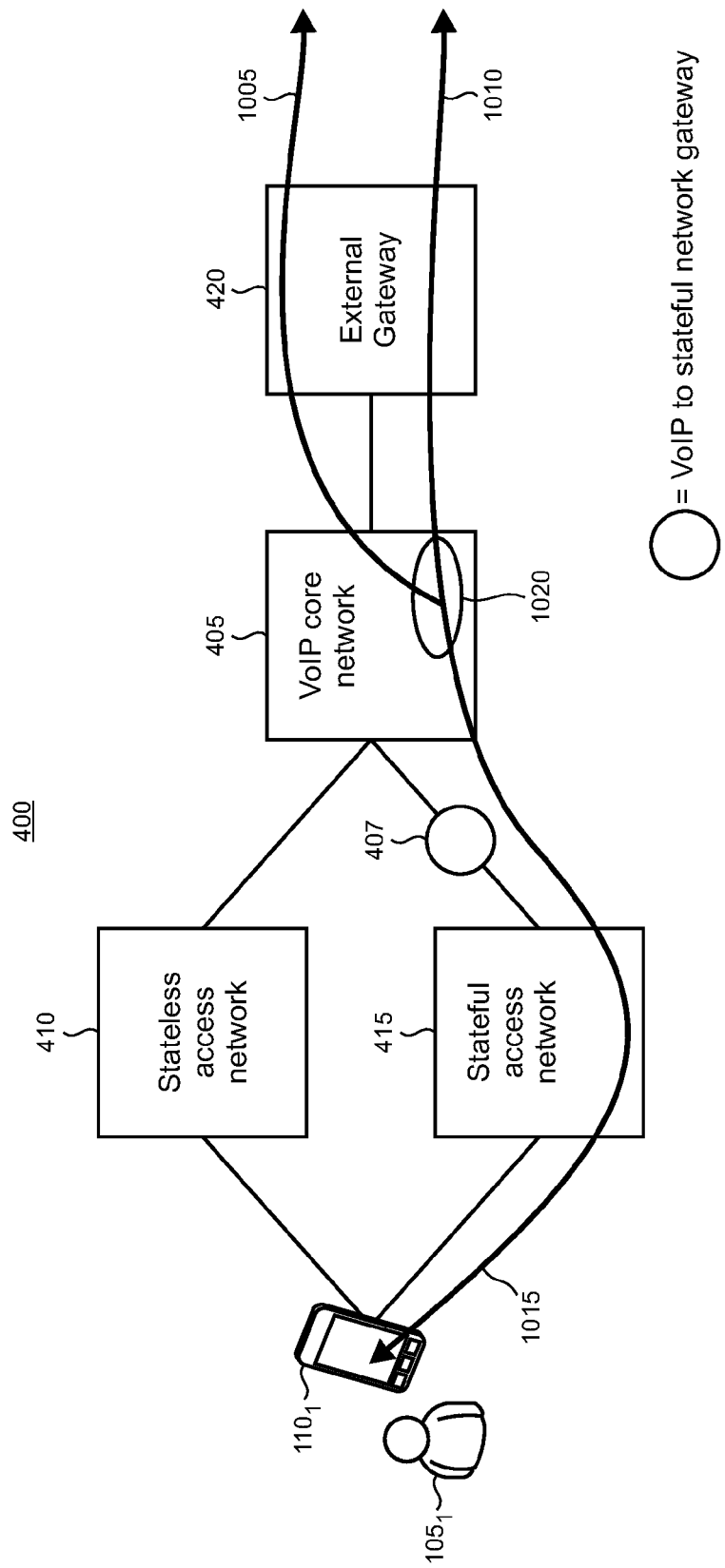
FIGS. 10-12 illustrative handling of a three-way call in a hybrid telecommunications network in which the present tunneling VoIP call control is implemented.

FIG. 10 shows an illustrative example of such multi-party call handling in the VoIP core network 405. As shown, the mobile device 110 sees only one active call 1015 that the VoIP core network 405 switches between two call flows indicated by reference numerals 1005 and 1010. A communications tunnel through the stateful access network 415 is implemented to pass information between the VoIP core network 405 and the mobile device 110 by placing supplemental calls of typically short duration through the stateful access network. The information is encoded into the called number (i.e., the caller-ID) of the short duration call so that state information or requests can be communicated. Certain called numbers (without loss of generality, examples could be "11111," "22222," etc.) have designated meanings while the remainder represent requests for new outgoing cellular calls to be originated.

In all cases these additional operations are originated on the stateful access network 415 as a second outgoing cellular call, but the VoIP core network 405 uses only the caller-ID and then immediately releases the new cellular call. Thus, there is only one persistent path between the mobile device 110 and the VoIP core network 405 through the stateful access network 415. The VoIP core network 405 includes a bridging/multiplexing component 1020 that can bridge and/ or multiplex multiple remote party connections into the single cellular connection to the mobile device through the stateful access network 415.

Figure 11:
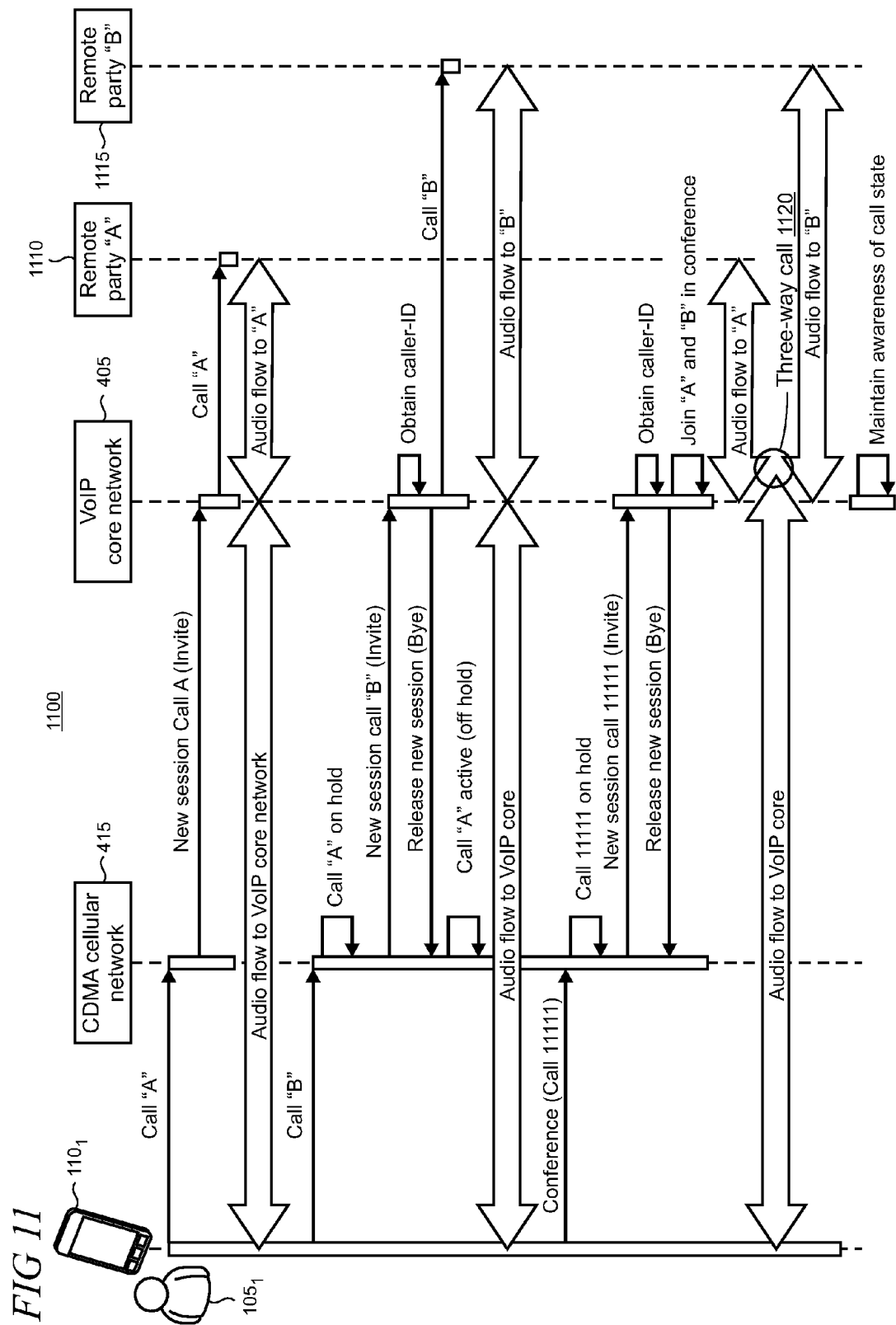
Figure 12:
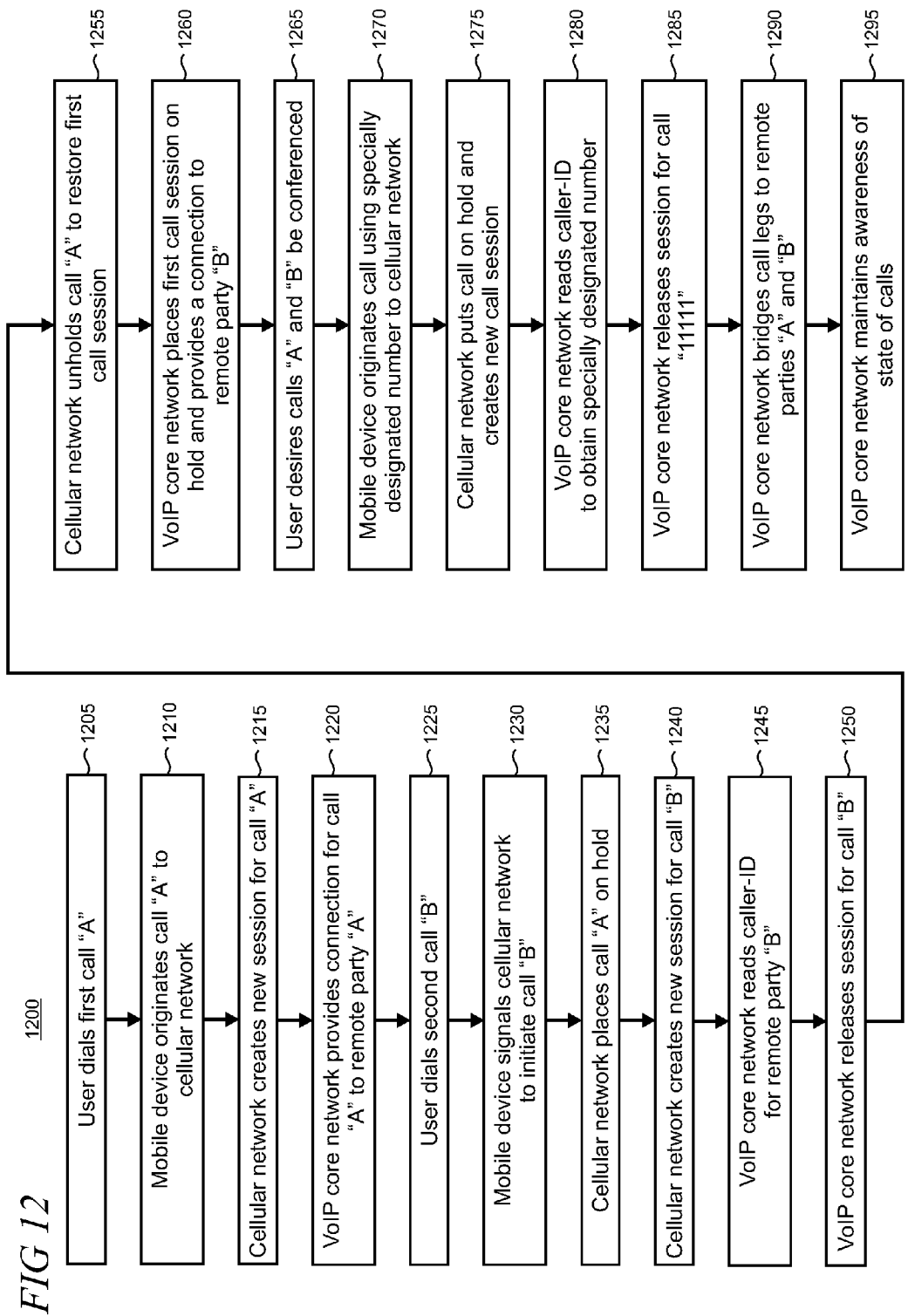

FIG. 11 shows a call flow diagram 1100 for an illustrative call flow for a typical three-way calling scenario in which a CDMA cellular network is utilized as a stateful access network 415 to a VoIP core network 405. FIG. 12 is a flowchart of a method 1200 that corresponds to the diagram 1100. The user behavior is the same as with the illustrative example shown above in the text accompanying FIGS. 8 and 9, but the implementation in the hybrid network is different from that in the conventional cellular network.

In step 1205 of the method 1200, the user 105 of the mobile device 110 dials the first call "A" to remote party "A" 1110. The mobile device originates the call to the cellular network 415 in step 1210. The cellular network 415 creates a first new session for call "A" in step 1215 using the SIP "Invite" method that is passed to the VoIP core network 405. The VoIP core network provides the call connection to the remote party "A" in step 1220. The user 105 dials the second call to the second remote party "B" 1115 in step 1225. The mobile device 110 signals the cellular network 415 to originate a call to the second remote party "B" in step 1230. The cellular network places call "A" on hold in step 1235.

The cellular network 415 creates a second new session for call "B" in step 1240 using the SIP Invite that is passed to the VoIP core network 405. The VoIP core network obtains the caller-ID (i.e., the called number) for call "B" from the cellular network in step 1245. The VoIP core network releases the second call session from the cellular network using the SIP "Bye" method in step 1250. The cellular network 415 will unhold the current call "A" (i.e., make call "A" active) to restore the current call session in step 1255. Using the first call session, the VoIP core network 405 places the existing call on hold and provides a connection to the remote party "B" 1115 in step 1260.

At this point in the call flow, there is a single call session through the cellular network 415, but the VoIP core network 405 is holding the state for two separate legs to the remote parties "A" and "B." Audio from the remote party "B" 1115 is now flowing to the mobile device 110 on the original (i.e., first) call session.

The user 105 indicates a desire that the calls to the remote parties "A" and "B" be conferenced together to effectuate a three-way call at step 1265. In the previous example, the user employed a conventional flash or similar operation on the mobile device to indicate to the cellular network that the calls be bridged. Here, by comparison, the user 105 can operate the mobile device 110 the same as before to signal bridging, but the flash signal is not actually sent by the device to the cellular network 415. Instead, when the flash operation is performed on the mobile device 110 (which is VCC-equipped as defined above), the mobile device will originate a call to the cellular network 415 using a specially designated number as the called telephone number in step 1270. For example, the number "11111" could be used (although it is emphasized that this number is merely illustrative and any of a variety of different numbers could be used in a given implementation).

When the call "11111" is received, the cellular network places the call on hold. Since the call originates from a VCC-equipped mobile device, the cellular network routes the call to the VoIP core network 405 in a new call session using the SIP "Invite" method in step 1275. The VoIP core network reads the caller-ID to obtain the specially designated number "11111" which it interprets as a conference bridging instruction from the user in step 1280. The VoIP core network releases the second call session using the SIP "Bye" method in step 1285 from the cellular network which unholds the call "11111" to restore the existing (i.e., original) call session. The VoIP core network 405 can then bridge the call legs to the remote parties "A" and "B" in step 1290 so that audio from the remote parties flows to the mobile device 110 over the cellular network 415 using the existing call session.

Similar to the previous example, in step 1295 the VoIP core network maintains an awareness of the state of both calls "A" and "B" while conferenced. For example, the VoIP core network can signal the user 105 by playing an audible tone or providing another indicator at the mobile device 110 if one of the remote parties drops from the three-way call.

Call waiting utilizes similar call flows as with conference calling, described above, in both conventional cellular network and hybrid network implementations. In a conventional CDMA cellular network (e.g., cellular network 415 in FIG. 8), when the user 105 is in an existing call with a remote party "A" and a new call arrives from remote party "B," the cellular network 415 signals to the mobile device 110 that a call is waiting and provides its caller-ID. When the user 105 indicates that the second incoming call should be answered, for example using a flash or similar operation, the mobile device signals the cellular network which places the call with remote party "A" on hold and connects the device to the remote party "B." The cellular network 415 maintains an awareness of the state of both calls with the remote parties "A" and "B" and will typically play a tone or provide some other indication to the mobile device if a party on hold disconnects.

In a hybrid network in which the present tunneling VoIP call control may be utilized, the user behavior at the mobile device 110 when dealing with call waiting is the same as with a conventional cellular network, but again differs in implementation (not shown in the drawings). As with the call flow 1100 in FIG. 11, when the user 105 is engaged in an existing call with the remote party "A" the cellular network 415 provides a connection between the mobile device 110 and the VoIP core network 405 while the core network provides the connection to the remote party "A" 1110. When a new call arrives from remote party "B" 1115, the VoIP core network 405 creates a new call session with the cellular network 415 for the inbound call. The cellular network will signal the mobile device 110 that an incoming call is waiting and provides its caller-ID. The VoIP core network will then release the second calling session.

When the user 105 indicates that the incoming call waiting is to be answered, using a flash or similar operation, the mobile device originates another call using a specially designated number, for example "22222" to the cellular network 415. The cellular network creates a new call session using the SIP "Invite" method which it passes to the VoIP core network 405. The VoIP core network reads the caller-ID to obtain the specially designated number "22222" which it interprets as a call waiting switching instruction from the user. The VoIP core network releases the second call session using the SIP "Bye" method. The VoIP core network places the call with remote party "A" on hold and connects remote party "B" to the existing (i.e., original) call session with the cellular network so that audio from call "B" is now flowing to the mobile device 110 over the cellular network 415 using the existing call session.

In the case of a GSM (Global System for Mobile Communications) network the precise call flows are different from those shown in the drawings, but the tunnel methodology is the same. When a cellular call is already in progress the mobile device 110 originates a new call to connect to a different party or to request a change in state (e.g., using the specially designated numbers "11111" and "22222" as discussed in the illustrative examples above). The VoIP core network handles this request, and if needed it may create a new external call leg, but it always immediately releases the second cellular call. Likewise, when a cellular call is in progress and the VoIP core network needs to send call state information to the mobile device, it does so by creating a new session (i.e., a new call to the mobile device) through the cellular network. The mobile device notes the caller-ID to obtain the call state information and the incoming call is subsequently released.

Additional scenarios are also possible. For example, both CDMA and GSM networks can establish conference calls with more than two remote participants. In this case, additional actions may include: disconnecting a selected remote party from the conference; connecting to a single remote party, placing the rest of the parties on hold (i.e., using a private sidebar), and; connecting all remote parties together in conference and disconnecting the device.

The present tunneling VoIP call control may implement these and other functions by sending additional defined codes (e.g. 33333, 44444, etc. . . . ) between the mobile device 110 and the VoIP core network 405. Because these functions are implemented by the VoIP core network 405, the mobile can provide multi-party calling features that are not directly supported by the stateful access network 415. For example, a CDMA network may only support three-way calling, but the mobile device 110 and VoIP core network 405 could implement an arbitrary N-way conference by applying tunneling VoIP call control.

Another exemplary function that may be implemented in some cases is using the present tunneling VoIP call control to reliably indicate call termination state on the mobile device. An illustrative usage scenario of such function includes the user 105 traveling in a car using the mobile device 110 on the stateful access network 415 while the VoIP core network 405 provides the connection to the remote party. When the car goes into a tunnel it is common to lose coverage on the network so the call from the mobile device 110 gets dropped. Since the call was being handled in the VoIP core network 405, various techniques could be employed to attempt to reconnect the user and the remote party once coverage to the stateful access network 415 is restored. However, in this illustrative scenario, at the point of time when the call is dropped, the VoIP core network 405 only knows that the call from the mobile device 110 terminated. The VoIP core network 405 does necessarily not know if the termination was intentional (e.g., the user 105 was finished with the call with the remote party and ended it), or non-intentional on the user's part due to loss of cellular network coverage as in the case with the tunnel scenario here.

Tunneling VoIP call control can be implemented in scenarios such as this to explicitly indicate to the VoIP core network 405 when a call termination was intentional, for example by originating a supplemental call using a specially designated number such as "33333." When the VoIP core network 405 reads the called number from the caller-ID, it can interpret the specially designated number as an intentional call termination instruction from the mobile device 110. Thus, if a call is terminated without the VoIP core network receiving the call termination instruction, then it is presumed that the termination was unintentional due to loss of cellular coverage.

Figure 13:
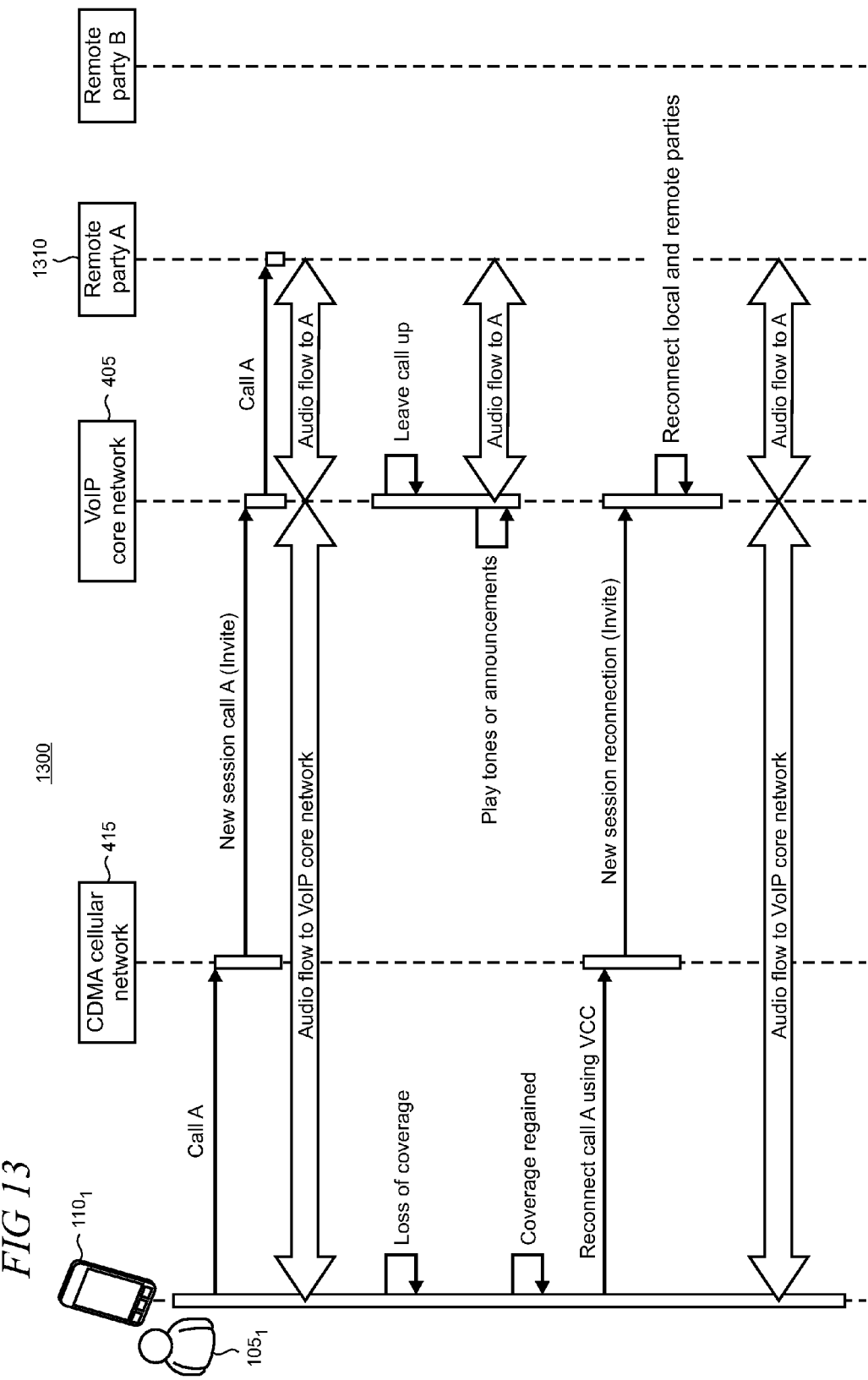
FIGS. 13 and 14 illustrate call handling in a hybrid telecommunications network when cellular access network coverage is lost.
Figure 14:
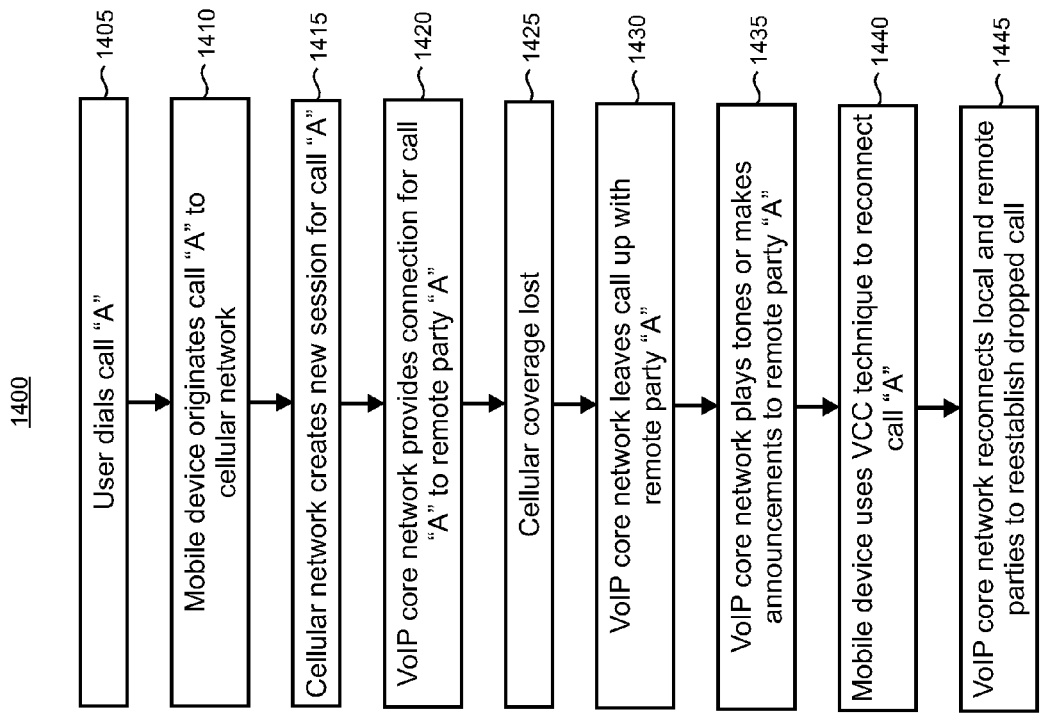

FIG. 13 shows a call flow diagram 1300 for an illustrative call flow in which a call is terminated and the explicit call termination instruction is not received by the VoIP core network. FIG. 14 is a flowchart of a method 1400 that corresponds to the diagram 1300.

In step 1405 of the method 1400, the user 105 of the mobile device 110 dials a call "A" to remote party "A" 1310. The mobile device originates the call to the cellular network 415 in step 1410. The cellular network 415 creates a new session for call "A" in step 1415 using the SIP "Invite" method that is passed to the VoIP core network 405. The VoIP core network provides the call connection to the remote party "A" in step 1420 and audio flow is established between the mobile device and the remote party "A."

In step 1425, a loss of coverage occurs on the stateful access network 415 such as when the mobile device goes into a tunnel or other area in which cellular service is unavailable. Since the VoIP core network 405 did not receive an explicit call termination instruction from the mobile device, it will leave the call up in step 1430. The VoIP core network can play tones or an announcement in some cases, in step 1435, to the remote party "A" to indicate, for example, that the local party lost coverage and that the remote party can hold on until a connection with the local party is reestablished.

After coverage is regained by the mobile device 110, it originates a reconnection for call "A" using, for example, a VCC technique in step 1440. The particular VCC technique utilized in this illustrative example may include one or more of the methods described in our co-pending U.S. patent application Ser. No. 14/026,933 filed on Sep. 13, 2013 which is incorporated by reference herein having the same effect as if set forth at length.

For example, the reconnection call to the cellular network 415 from the mobile device 110 may use a dialed number that comprises a special VCC identifier that is then employed by the VoIP core network 405 to associate all call legs pertaining to call "A." Since the reconnection for call "A" originates from a VCC-equipped mobile device, the cellular network routes it to the VoIP core network 405 in a new call session using the SIP "Invite" method. The VoIP core network reads the VCC identifier from the caller-ID and then releases the new session. The VoIP core network can use the VCC identifier to associate the incoming call leg from the mobile device 110 with the existing call leg to the remote party "A" that was left up when cellular coverage was lost. Using this association, the VoIP core network can thereby reconnect the parties so that audio again flows and the previously dropped call is reestablished in step 1445.

Figure 15:
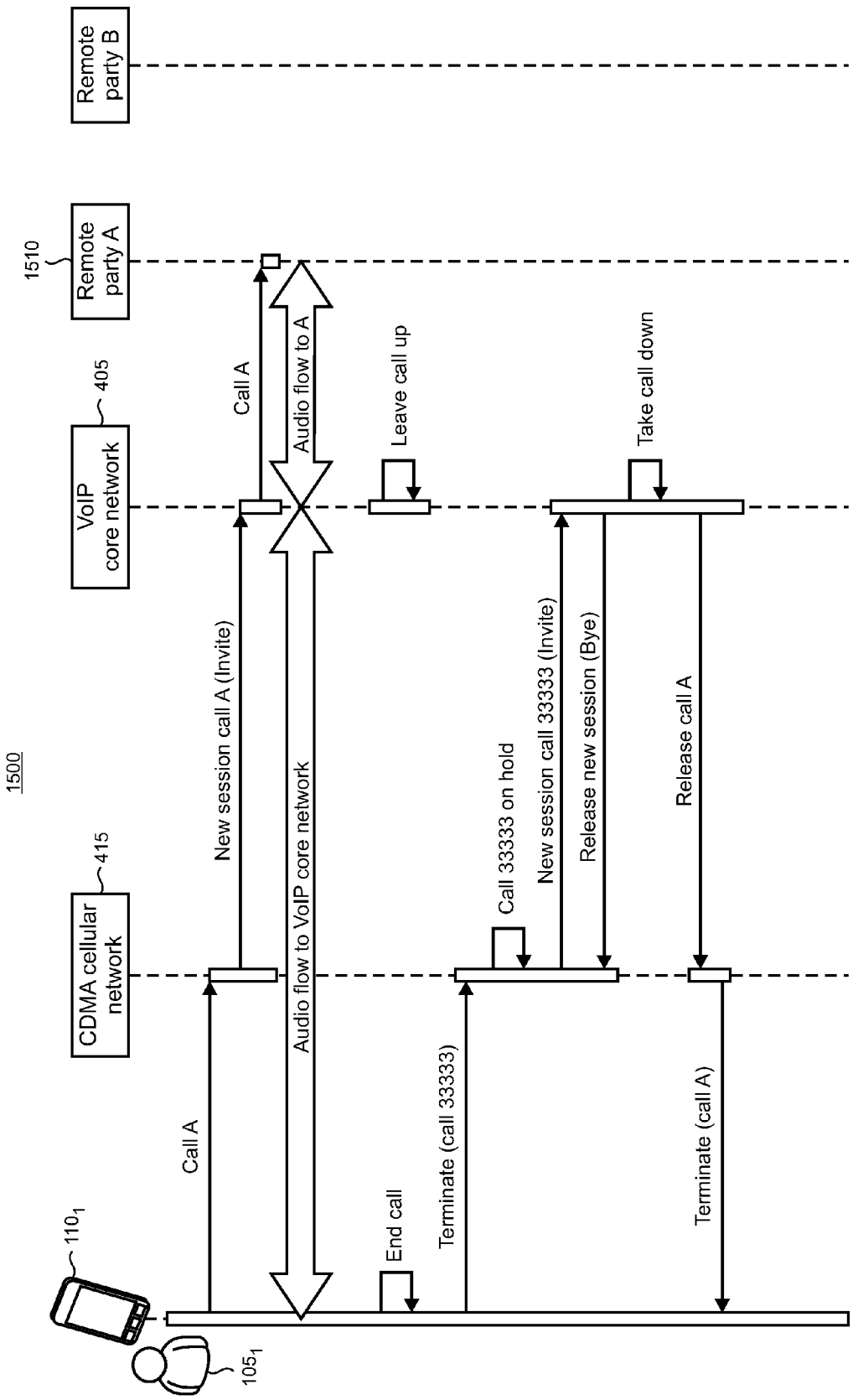
FIGS. 15 and 16 illustrate call handling in a hybrid telecommunications network in which an explicit call termination is provided from a mobile device to a core VoIP network using the present tunneling VoIP call control.
Figure 16:
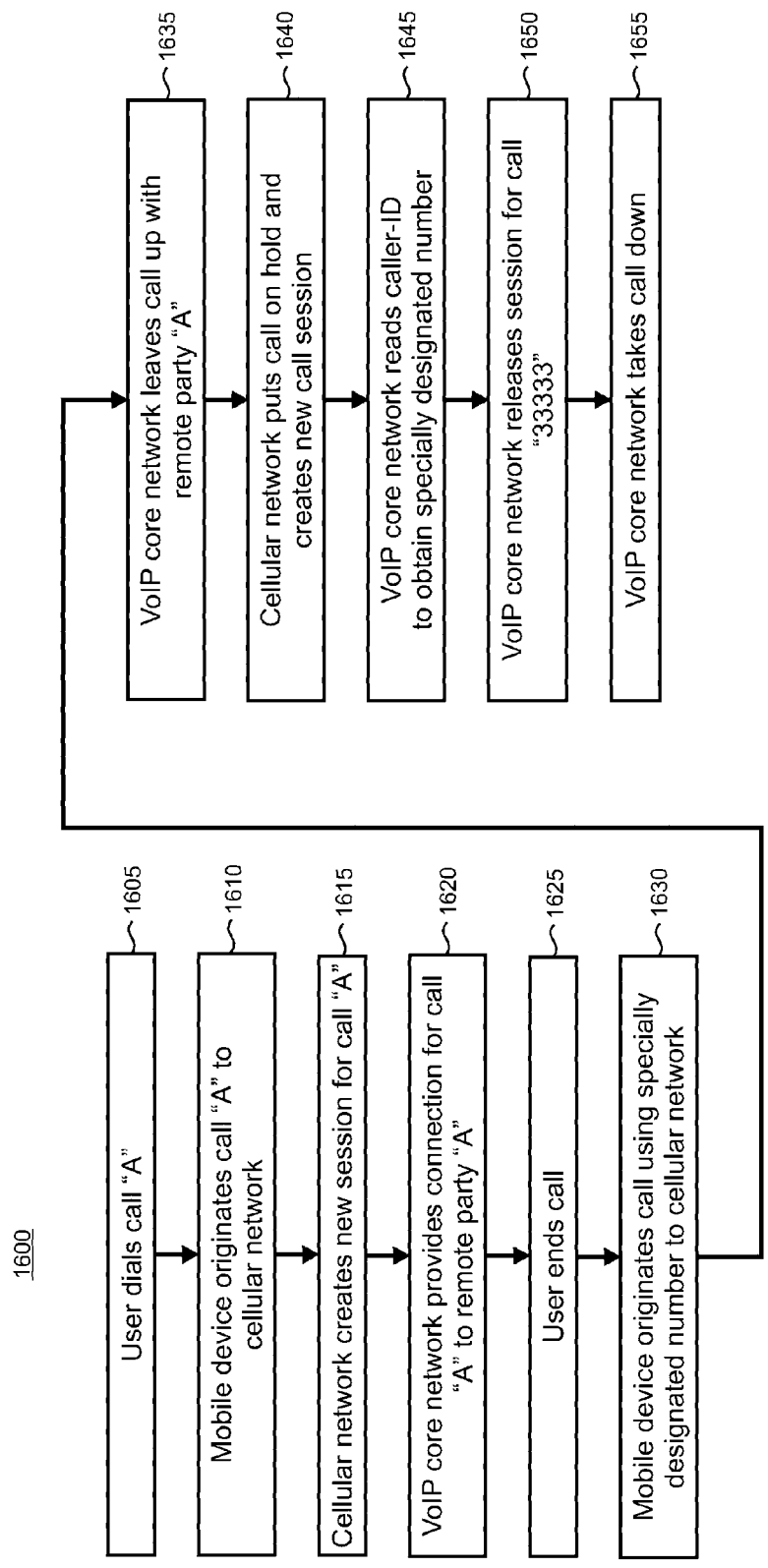

FIG. 15 shows a call flow diagram 1500 for an illustrative call flow in which a call is terminated and an explicit call termination instruction is received by the VoIP core network. FIG. 16 is a flowchart of a method 1600 that corresponds to the diagram 1500.

As with the previous illustrative example, in step 1605, the user 105 of the mobile device 110 dials a call "A" to remote party "A" 1510. The mobile device originates the call to the cellular network 415 in step 1610. The cellular network 415 creates a new session for call "A" in step 1615 using the SIP "Invite" method that is passed to the VoIP core network 405. The VoIP core network provides the call connection to the remote party "A" in step 1620 and audio flow is established between the mobile device and the remote party "A."

When the call with the remote party "A" is over the user 105 intentionally ends the call in step 1625. The user typically will press the "end" button or an equivalent control on the mobile device 110 which will originate a call to the cellular network 415 using a specially designated number as the called telephone number in step 1630. For example, the number "33333" could be used (although it is emphasized that this number is merely illustrative and any of a variety of different numbers could be used in a given implementation).

In some implementations, the mobile device 110 will place the supplemental call to the cellular network after the call "A" to the remote party is actually terminated. In this case, the VoIP core network 405 sees that the mobile phone 110 has ended its call with the remote party and will leave the call up in step 1635, as in the previous illustrative example, unless or until it receives an explicit call termination instruction. If the VoIP core network does not receive the call termination instruction within some predetermined time interval (which can vary by implementation), then it can follow the method 1400 shown in FIG. 14 and attempt to reconnect to mobile device 110 while playing tones or announcements to the remote party "A."

In other implementations, the mobile device 110 will delay the actual termination of the call after the user presses the "end" button so that the explicit call termination instruction will be originated and received by the VoIP core network 405 before the VoIP core network sees the termination of call "A." In this latter case, the behavior of the mobile device from the user's perspective will typically be implemented as if the call were terminated with the user's button press. Since the received call termination instruction enables the VoIP core network to expect the later occurring actual call termination, the network can typically take down the connection to the remote party as soon as the call termination instruction is received without having to leave the call up for any period of time.

When the call "33333" is received, the cellular network places the call on hold. Since the call originates from a VCC-equipped mobile device, the cellular network routes the call to the VoIP core network 405 in a new call session using the SIP "Invite" method in step 1640. The VoIP core network reads the caller-ID to obtain the specially designated number "33333" which it interprets as a call termination instruction from the user in step 1645. The VoIP core network releases the call session using the SIP "Bye" method from the cellular network in step 1650 and takes down the call to the remote party "A" in step 1655 which comprises releasing the call to the remote party "A" and releasing the call back to the cellular network 415. The cellular network then sends a release to the mobile device 110 to terminate the call.

Figure 17:
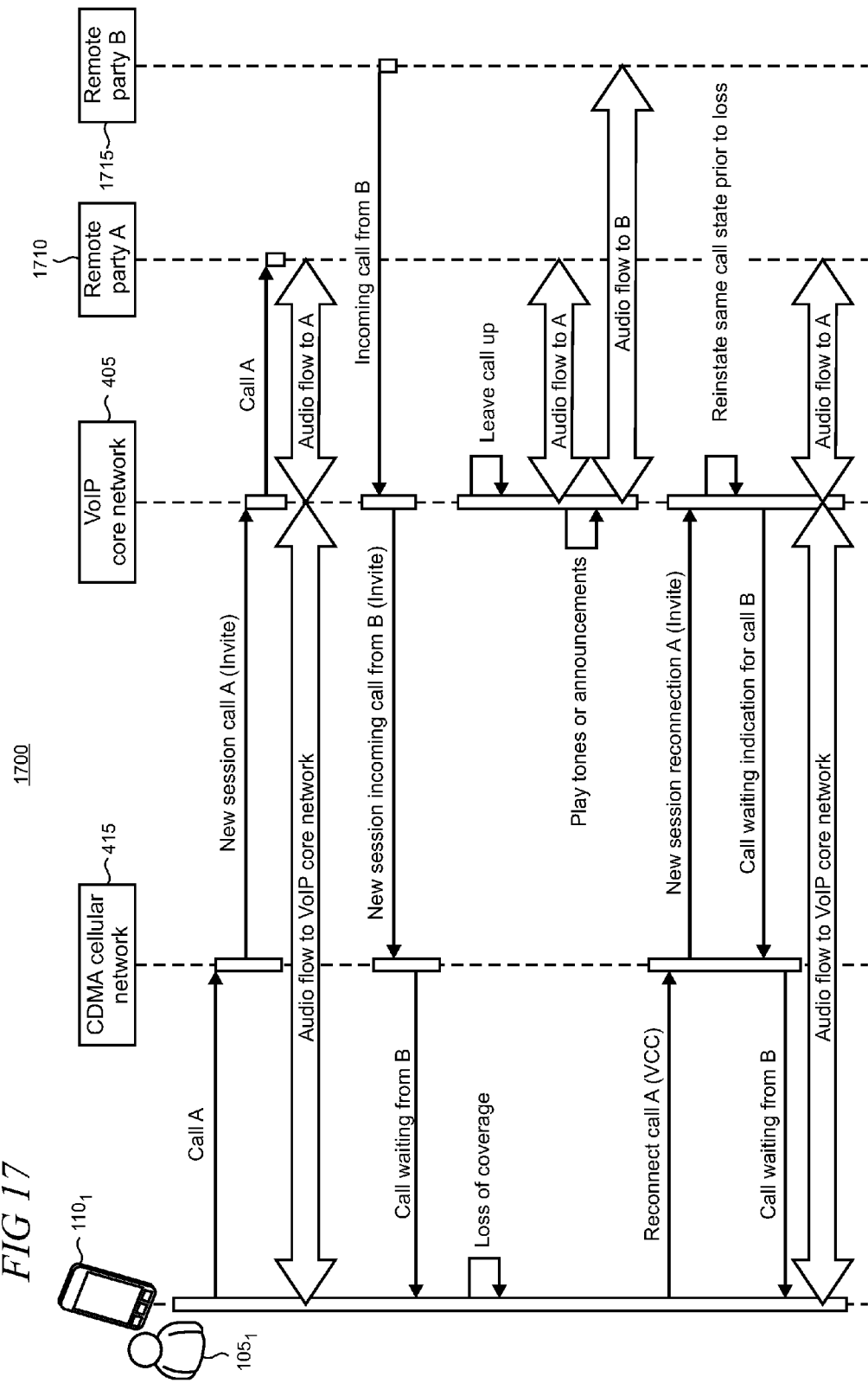
FIGS. 17 and 18 illustrate multi-party call handling in a hybrid telecommunications network when cellular access network coverage is lost.
Figure 18:
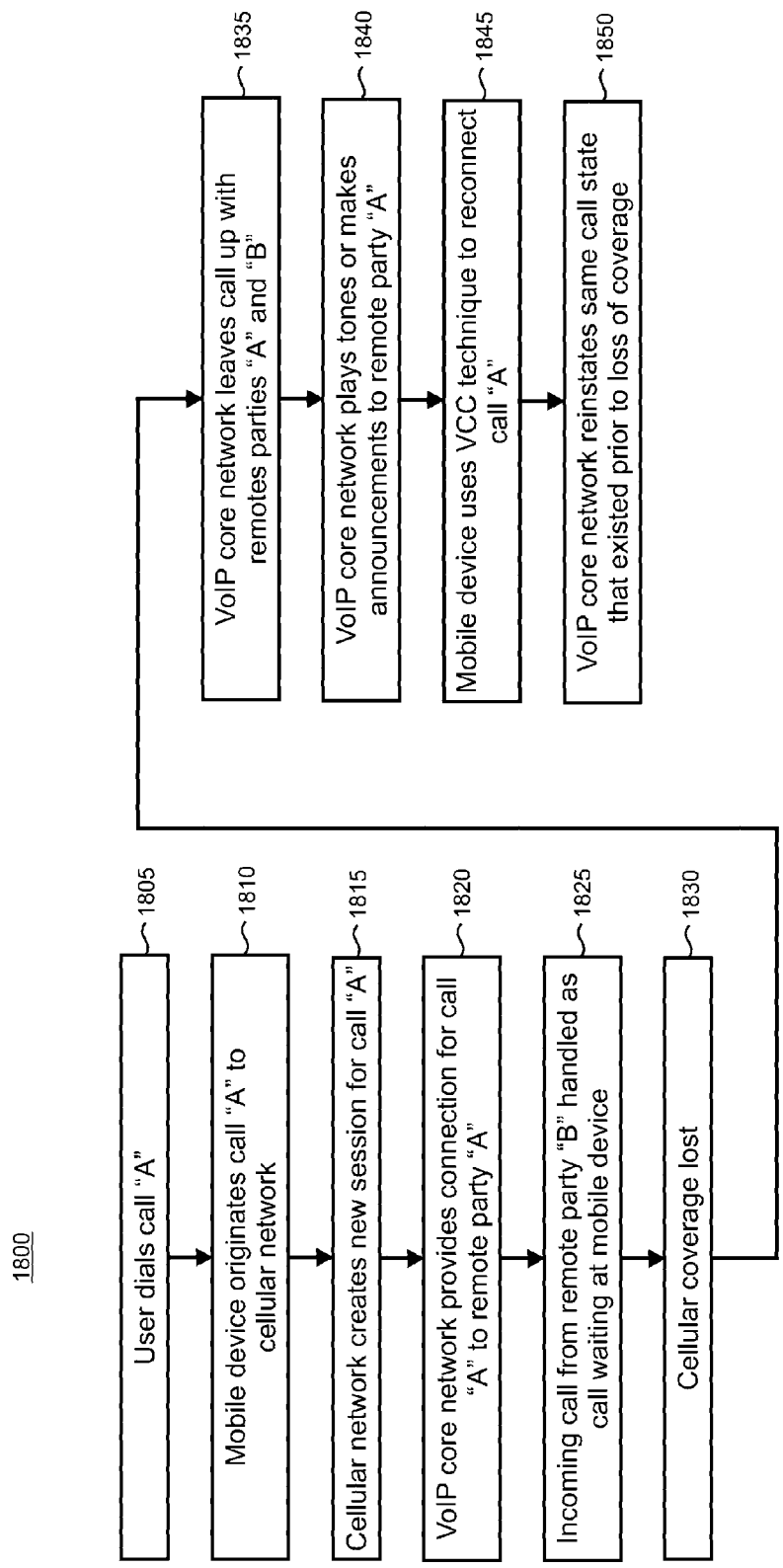

FIG. 17 shows a call flow diagram 1700 for an illustrative call flow in which two existing calls are pending and terminated and an explicit call termination instruction is not received by the VoIP core network. FIG. 18 is a flowchart of a method 1800 that corresponds to the diagram 1700. This call flow is similar to that shown in FIG. 13 except that the mobile device 110 receives an incoming call from the remote party "B" as a call waiting.

In step 1805 of the method 1800, the user 105 of the mobile device 110 dials a call "A" to remote party "A" 1710. The mobile device originates the call to the cellular network 415 in step 1810. The cellular network 415 creates a new session for call "A" in step 1815 using the SIP "Invite" method that is passed to the VoIP core network 405. The VoIP core network provides the call connection to the remote party "A" in step 1820 and audio flow is established between the mobile device and the remote party "A."

An incoming call from remote party "B" 1715 is received by the VoIP core network 405. A new session is originated for the incoming call with the cellular network 415 which presents it as a call waiting to the mobile device 110 in step 1825. In some implementations, the user 105 can switch between call "A" and call "B" using a flash operation.

In step 1830, a loss of coverage occurs on the stateful access network 415 such as when the mobile device goes into a tunnel or other area in which cellular service is unavailable. Since the VoIP core network 405 did not receive an explicit call termination instruction from the mobile device, it will leave both the existing pending calls up in step 1835. The VoIP core network can play tones or an announcement in some cases, in step 1840, to each of the remote parties "A" and "B" to indicate, for example, that the local party lost coverage and that each remote party can hold on until a connection with the local party is reestablished.

In step 1845, after coverage is regained by the mobile device 110, it originates a reconnection for call "A," for example using the VCC technique described above. The VoIP core network can reconnect the local and remote parties using the VCC identifier to associate the reconnection call leg with the existing leg and also send a call waiting indication to the mobile device 110 through the cellular network. This enables the same call state that existed prior to the loss of coverage to be reinstated for each call in step 1850. This previous call state includes audio flow between the mobile device 110 and the remote party "A" and a call waiting for the incoming call from remote party "B."

Figure 19:
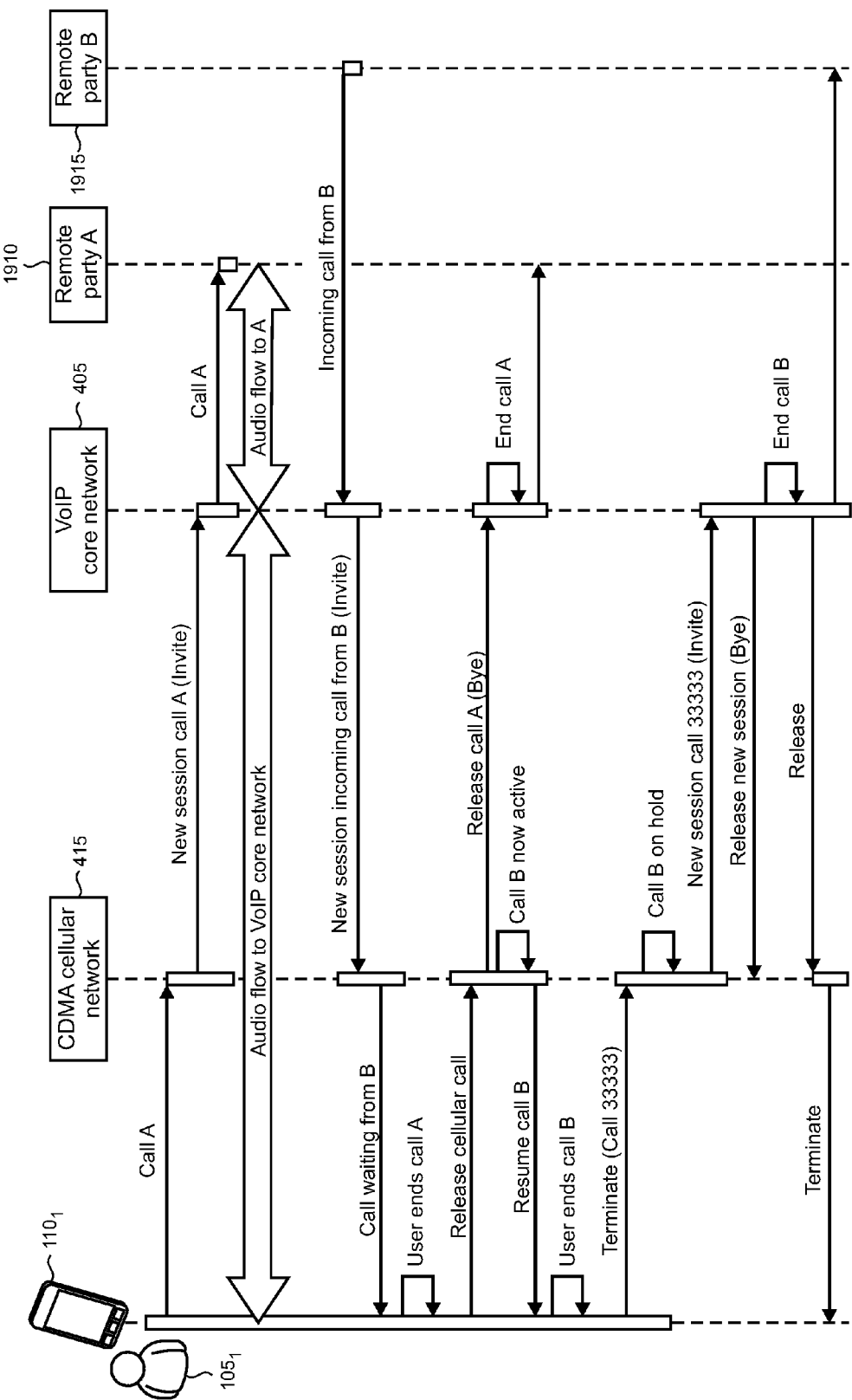
FIGS. 19 and 20 illustrate multi-party call handling in a hybrid telecommunications network in which an explicit call termination is provided from a mobile device to a core VoIP network using the present tunneling VoIP call control.
Figure 20:
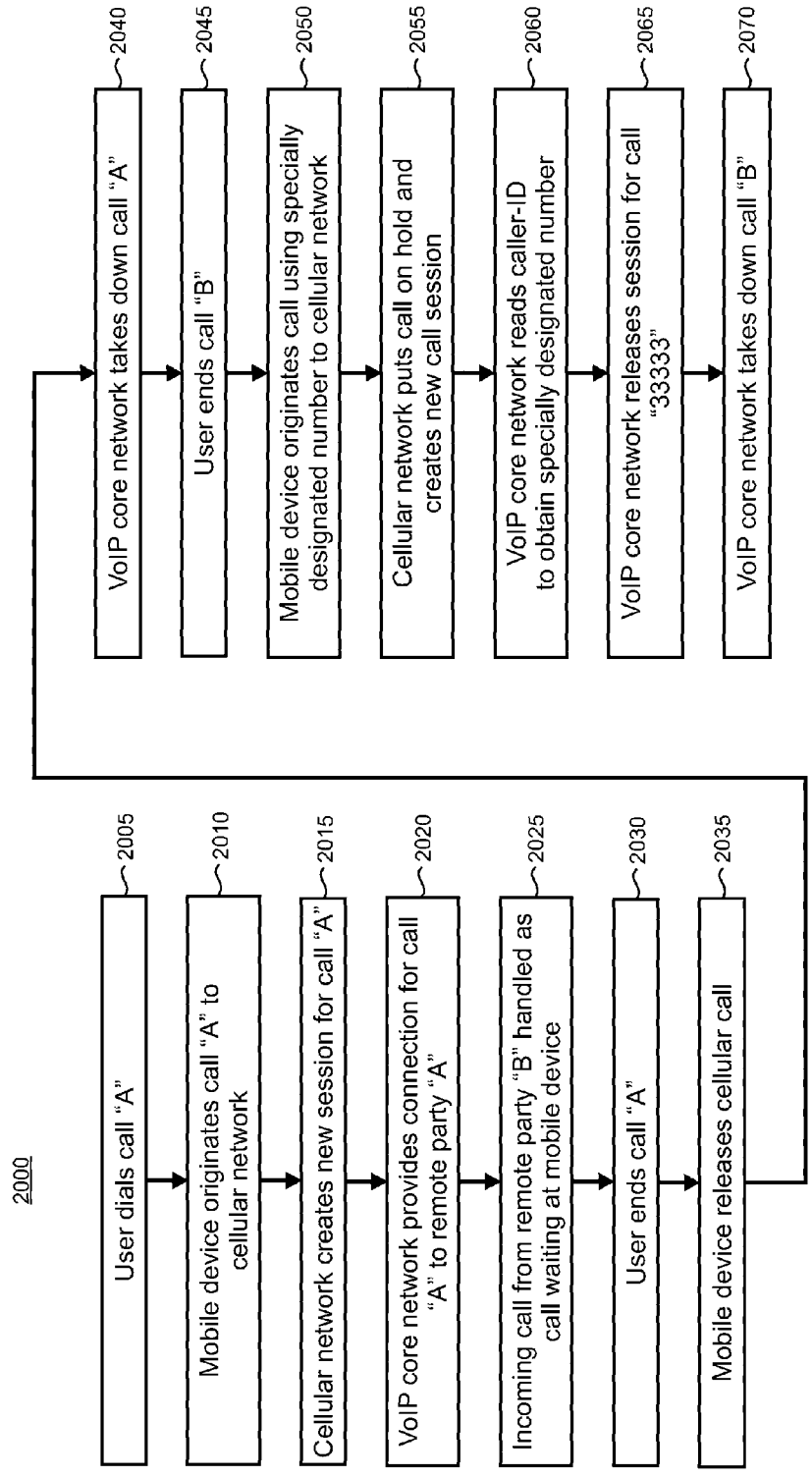

FIG. 19 shows a call flow diagram 1900 for an illustrative call flow in which multiple existing calls are terminated and an explicit call termination instruction is received by the VoIP core network. FIG. 20 is a flowchart of a method 2000 that corresponds to the diagram 1900. This call flow is similar to that shown in FIG. 15 except that the mobile device 110 receives an incoming call from the remote party "B" as a call waiting.

The user 105 of the mobile device 110 dials a call "A" to remote party "A" 1910 in step 2005 of the method 2000. The mobile device originates the call to the cellular network 415 in step 2010. The cellular network 415 creates a new session for call "A" in step 2015 using the SIP "Invite" method that is passed to the VoIP core network 405. The VoIP core network provides the call connection to the remote party "A" in step 2020 and audio flow is established between the mobile device and the remote party "A."

An incoming call from remote party "B" 1915 is received by the VoIP core network 405. A new session is originated for the incoming call with the cellular network 415 which presents it as a call waiting to the mobile device 110 in step 2025. When the mobile device is supporting both active and held calls at the same time, it typically cannot place a supplemental call to the specially designated number "33333" to terminate one of the calls due to limitations imposed by some CDMA cellular networks.

When the call with the remote party "A" is over, the user 105 intentionally ends the call in step 2030. When the mobile device 110 is supporting both active and held calls at the same time, it typically cannot place a supplemental call to the specially designated number "33333" to terminate one of the calls due to limitations imposed by some CDMA cellular networks. Instead, the mobile phone releases the cellular call in step 2035 so that the CDMA network ends the active call "A." Seeing that call "B" is still active, the VoIP network ends call "A" in step 2040 and releases the remote party "A." In step 2040, the cellular network calls the mobile device 110 back to resume the held call "B."

When the cellular network ends call "A" the VoIP core network 405 can see that call "B" was not dropped and may thus infer that the termination of call "A" was likely intentional. Had both pending calls terminated substantially at the same time, such termination could be taken as an indication that the mobile phone 110 experienced loss of cellular coverage. Alternatively, to explicitly indicate that the termination of call "A" was intentional (not shown in FIGS. 19 and 20), the mobile phone 110 can originate a call to the cellular network 415 using a specially designated number as the called telephone number. For example, the number "33333" could be used as with the previous illustrative example. In this alternative implementation, the VoIP core network takes down call "A" when it reads the specially designated number "33333" from the caller-ID and interprets it as an explicit call termination instruction.

When the call with the remote party "B" is over, the user 105 intentionally ends the call in step 2045. Here, in order to explicitly indicate that the termination was intentional, the mobile phone 110 will originate a call to the cellular network 415 using a specially designated "33333" number as the called telephone number in step 2050. When the call "33333" is received, the cellular network places the call on hold. Since the call originates from a VCC-equipped mobile device, the cellular network routes the call to the VoIP core network 405 in a new call session using the SIP "Invite" method in step 2055. The VoIP core network reads the caller-ID to obtain the specially designated number "33333" which it interprets as a call termination instruction from the user in step 2060. The VoIP core network releases the call session using the SIP "Bye" method from the cellular network in step 2065 and takes down the call to the remote party "B" in step 2070.

The method noted above to reliably detect an intentional call termination may also be effectively used when the user 105 intentionally ends both call "A" and call "B" at about the same time. While such simultaneous termination could suggest that the user 105 has experienced a loss of cellular coverage, the VoIP core network 405 will be able to disambiguate the call flows between intentional and unintentional call terminations. A simultaneous call termination without origination and receipt of the "33333" call termination instruction is likely an unintentional termination. By contrast, if both calls terminate around the same time but the "33333" call termination instruction is originated and received then the simultaneous call termination was likely intended by the user 105. In an alternative implementation, both call "A" and call "B" may implement an explicit call termination indication using, for example, the special designated number "33333" for call "A" and "44444" for call "B."

An alternative implementation of tunneling VoIP call control can exchange call state information in either or both directions between the mobile device 110 and the VoIP core network 405 using audio tones such as DTMF (Dual Tone Multi-Frequency) tones within the existing call.

Figure 21:
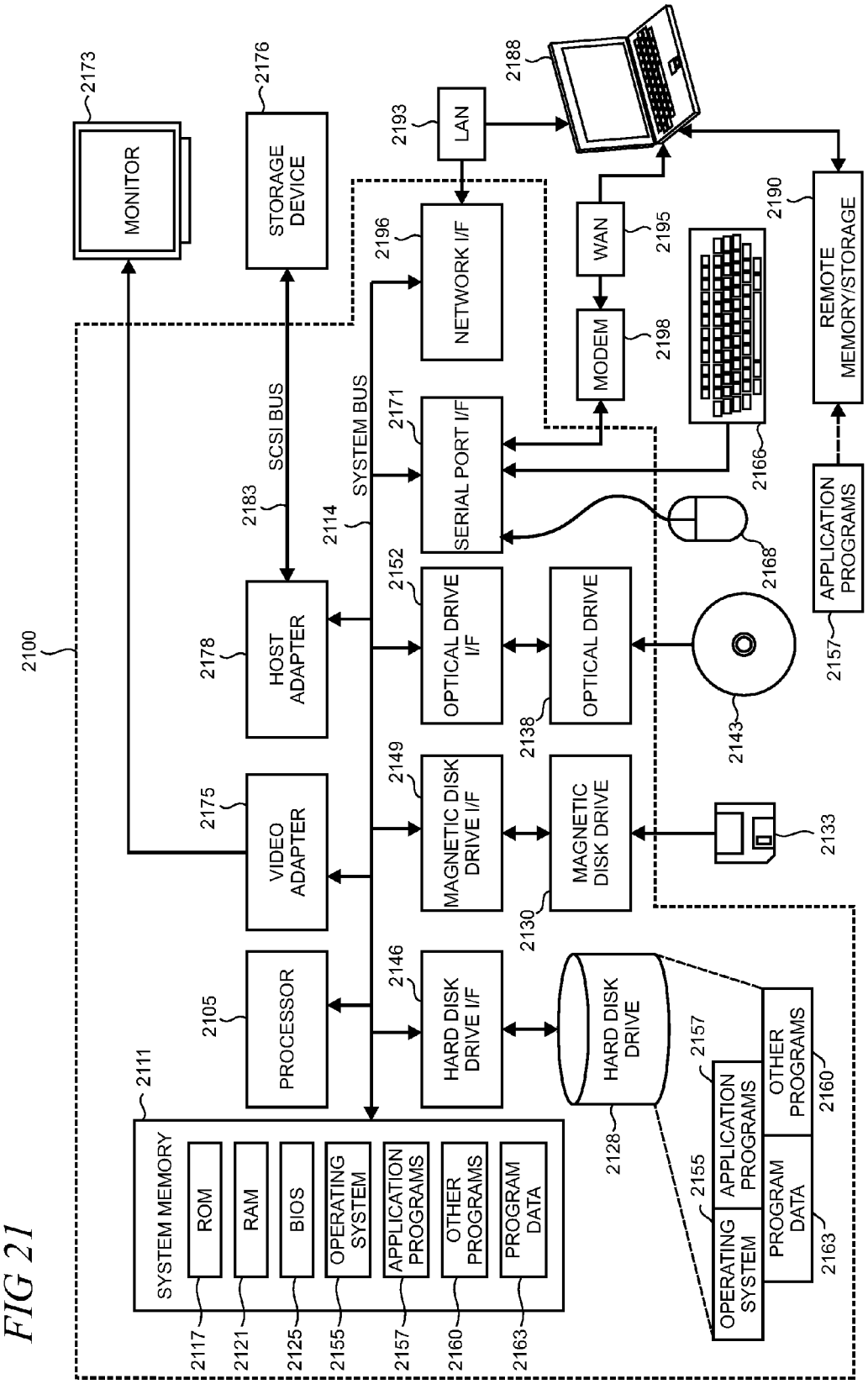
FIG. 21 is a simplified block diagram of an illustrative computer system such as a personal computer ("PC") that may be used in part to implement the present tunneling VoIP call control.

FIG. 21 is a simplified block diagram of an illustrative computer system 2100 such as a personal computer ("PC"), client machine, or server with which the present tunneling VoIP call control may be implemented. Computer system 2100 includes a processor 2105, a system memory 2111, and a system bus 2114 that couples various system components including the system memory 2111 to the processor 2105. The system bus 2114 may be any of several types of bus structures including a memory bus or memory controller, a peripheral bus, or a local bus using any of a variety of bus architectures. The system memory 2111 includes read only memory (ROM) 2117 and random access memory (RAM) 2121. A basic input/output system (BIOS) 2125, containing the basic routines that help to transfer information between elements within the computer system 2100, such as during startup, is stored in ROM 2117. The computer system 2100 may further include a hard disk drive 2128 for reading from and writing to an internally disposed hard disk (not shown), a magnetic disk drive 2130 for reading from or writing to a removable magnetic disk 2133 (e.g., a floppy disk), and an optical disk drive 2138 for reading from or writing to a removable optical disk 2143 such as a CD (compact disc), DVD (digital versatile disc), or other optical media. The hard disk drive 2128, magnetic disk drive 2130, and optical disk drive 2138 are connected to the system bus 2114 by a hard disk drive interface 2146, a magnetic disk drive interface 2149, and an optical drive interface 2152, respectively. The drives and their associated computer-readable storage media provide non-volatile storage of computer-readable instructions, data structures, program modules, and other data for the computer system 2100. Although this illustrative example includes a hard disk, a removable magnetic disk 2133, and a removable optical disk 2143, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present tunneling VoIP call control. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk 2128, magnetic disk 2133, optical disk 2143, ROM 2117, or RAM 2121, including an operating system 2155, one or more application programs 2157, other program modules 2160, and program data 2163. A user may enter commands and information into the computer system 2100 through input devices such as a keyboard 2166 and pointing device 2168 such as a mouse. Other input devices (not shown) may include a microphone, joystick, game pad, satellite dish, scanner, trackball, touchpad, touch screen, touch-sensitive device, voice-command module or device, user motion or user gesture capture device, or the like. These and other input devices are often connected to the processor 2105 through a serial port interface 2171 that is coupled to the system bus 2114, but may be connected by other interfaces, such as a parallel port, game port, or universal serial bus ("USB"). A monitor 2173 or other type of display device is also connected to the system bus 2114 via an interface, such as a video adapter 2175. In addition to the monitor 2173, personal computers typically include other peripheral output devices (not shown), such as speakers and printers. The illustrative example shown in FIG. 21 also includes a host adapter 2178, a Small Computer System Interface ("SCSI") bus 2183, and an external storage device 2176 connected to the SCSI bus 2183.

The computer system 2100 is operable in a networked environment using logical connections to one or more remote computers, such as a remote computer 2188. The remote computer 2188 may be selected as another personal computer, a server, a router, a network PC, a peer device, or other common network node, and typically includes many or all of the elements described above relative to the computer system 2100, although only a single representative remote memory/storage device 2190 is shown in FIG. 21. The logical connections depicted in FIG. 21 include a local area network ("LAN") 2193 and a wide area network ("WAN") 2195. Such networking environments are often deployed, for example, in offices, enterprise-wide computer networks, intranets, and the Internet.

When used in a LAN networking environment, the computer system 2100 is connected to the local area network 2193 through a network interface or adapter 2196. When used in a WAN networking environment, the computer system 2100 typically includes a broadband modem 2198, network gateway, or other means for establishing communications over the wide area network 2195, such as the Internet. The broadband modem 2198, which may be internal or external, is connected to the system bus 2114 via a serial port interface 2171. In a networked environment, program modules related to the computer system 2100, or portions thereof, may be stored in the remote memory storage device 2190. It is noted that the network connections shown in FIG. 21 are illustrative and other means of establishing a communications link between the computers may be used depending on the specific requirements of an application of tunneling VoIP call control.

Figure 22:
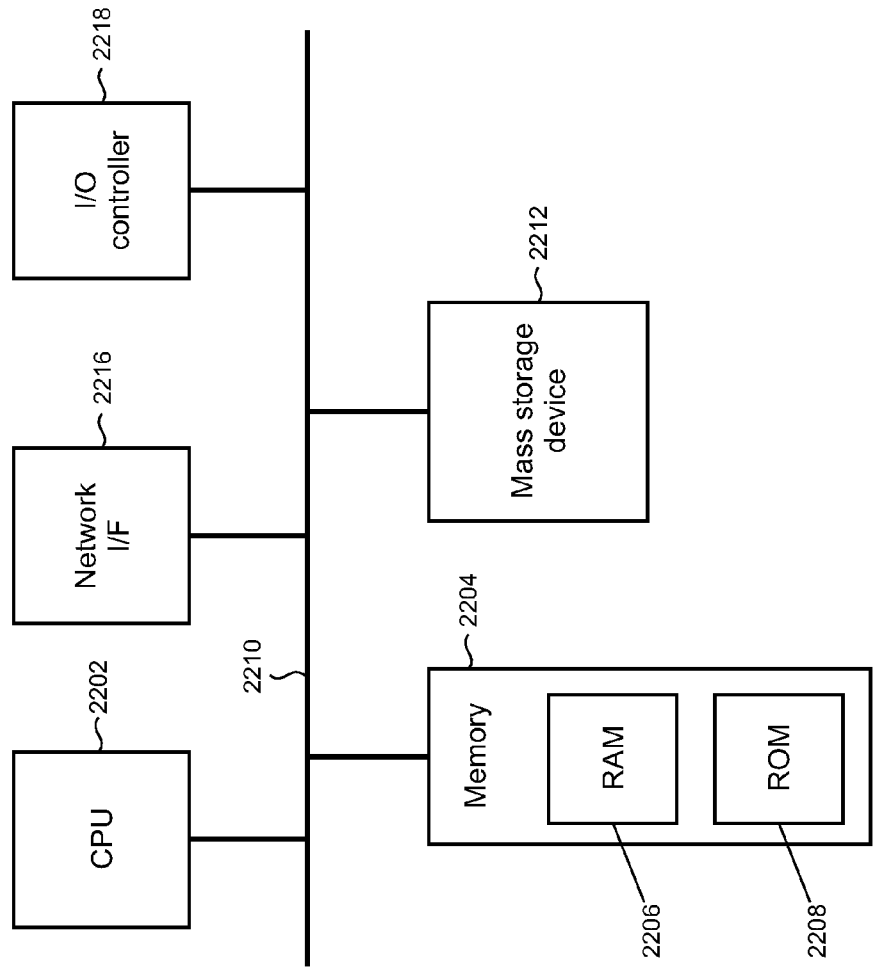
FIG. 22 shows a block diagram of an illustrative device that may be used in part to implement the present tunneling VoIP call control.

FIG. 22 shows an illustrative architecture 2200 for a device capable of executing the various components described herein for providing voice call continuity. Thus, the architecture 2200 illustrated in FIG. 22 shows an architecture that may be adapted for a server computer, mobile phone, a PDA (personal digital assistant), a smartphone, a desktop computer, a netbook computer, a tablet computer, GPS (Global Positioning System) device, gaming console, and/or a laptop computer. The architecture 2200 may be utilized to execute any aspect of the components presented herein.

The architecture 2200 illustrated in FIG. 22 includes a CPU 2202, a system memory 2204, including a RAM 2206 and a ROM 2208, and a system bus 2210 that couples the memory 2204 to the CPU 2202. A basic input/output system containing the basic routines that help to transfer information between elements within the architecture 2200, such as during startup, is stored in the ROM 2208. The architecture 2200 further includes a mass storage device 2212 for storing software code or other computer-executed code that is utilized to implement applications, the file system, and the operating system.

The mass storage device 2212 is connected to the CPU 2202 through a mass storage controller (not shown) connected to the bus 2210. The mass storage device 2212 and its associated computer-readable storage media provide non-volatile storage for the architecture 2200.

Although the description of computer-readable storage media contained herein refers to a mass storage device, such as a hard disk or CD-ROM drive, it should be appreciated by those skilled in the art that computer-readable storage media can be any available storage media that can be accessed by the architecture 2200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), BLU-RAY, or other optical storage, magnetic cassettes, magnetic tape, magnetic disk storage or other magnetic storage devices, or any other medium which can be used to store the desired information and which can be accessed by the architecture 2200.

According to various embodiments, the architecture 2200 may operate in a networked environment using logical connections to remote computers through a network. The architecture 2200 may connect to the network through a network interface unit 2216 connected to the bus 2210. It should be appreciated that the network interface unit 2216 also may be utilized to connect to other types of networks and remote computer systems. The architecture 2200 also may include an input/output controller 2218 for receiving and processing input from a number of other devices, including a keyboard, mouse, or electronic stylus (not shown in FIG. 22). Similarly, the input/output controller 2218 may provide output to a display screen, a printer, or other type of output device (also not shown in FIG. 22).

It should be appreciated that the software components described herein may, when loaded into the CPU 2202 and executed, transform the CPU 2202 and the overall architecture 2200 from a general-purpose computing system into a special-purpose computing system customized to facilitate the functionality presented herein. The CPU 2202 may be constructed from any number of transistors or other discrete circuit elements, which may individually or collectively assume any number of states. More specifically, the CPU 2202 may operate as a finite-state machine, in response to executable instructions contained within the software modules disclosed herein. These computer-executable instructions may transform the CPU 2202 by specifying how the CPU 2202 transitions between states, thereby transforming the transistors or other discrete hardware elements constituting the CPU 2202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the architecture 2200 in order to store and execute the software components presented herein. It also should be appreciated that the architecture 2200 may include other types of computing devices, including handheld computers, embedded computer systems, smartphones, PDAs, and other types of computing devices known to those skilled in the art. It is also contemplated that the architecture 2200 may not include all of the components shown in FIG. 22, may include other components that are not explicitly shown in FIG. 22, or may utilize an architecture completely different from that shown in FIG. 22.

Figure 23:
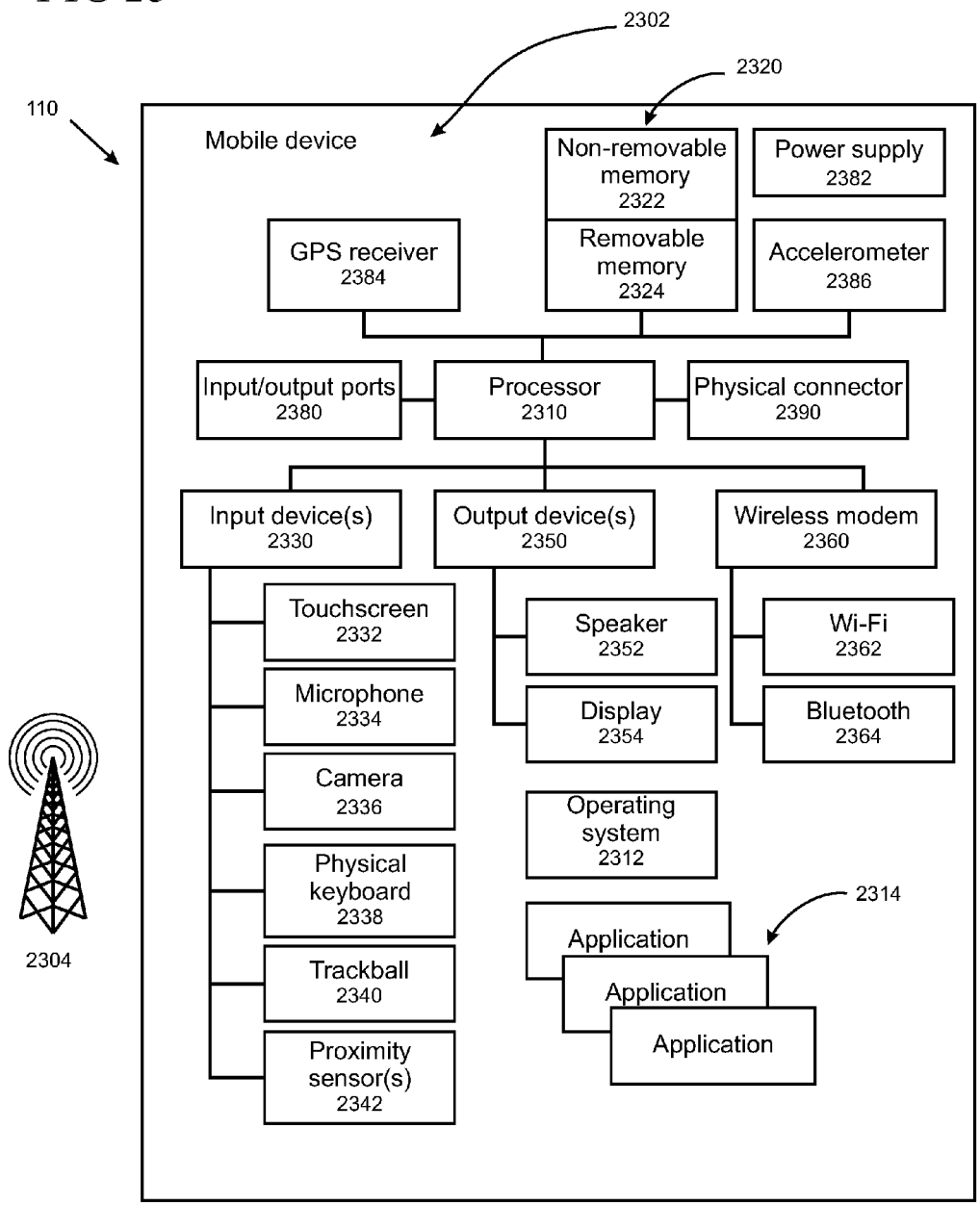
FIG. 23 is a block diagram of an illustrative mobile device.

FIG. 23 is a functional block diagram of an illustrative mobile device 110 such as a mobile phone or smartphone including a variety of optional hardware and software components, shown generally at 2302. Any component 2302 in the mobile device can communicate with any other component, although, for ease of illustration, not all connections are shown. The mobile device can be any of a variety of computing devices (e.g., cell phone, smartphone, handheld computer, Personal Digital Assistant (PDA), etc.) and can allow wireless two-way communications with one or more mobile communication networks 2304, such as a cellular or satellite network.

The illustrated mobile device 110 can include a controller or processor 2310 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 2312 can control the allocation and usage of the components 2302, including power states, above-lock states, and below-lock states, and provides support for one or more application programs 2314. The application programs can include common mobile computing applications (e.g., image-capture applications, email applications, calendars, contact managers, web browsers, messaging applications), or any other computing application.

The illustrated mobile device 110 can include memory 2320. Memory 2320 can include non-removable memory 2322 and/or removable memory 2324. The non-removable memory 2322 can include RAM, ROM, Flash memory, a hard disk, or other well-known memory storage technologies. The removable memory 2324 can include Flash memory or a Subscriber Identity Module (SIM) card, which is well known in GSM (Global System for Mobile communications) systems, or other well-known memory storage technologies, such as "smart cards." The memory 2320 can be used for storing data and/or code for running the operating system 2312 and the application programs 2314. Example data can include web pages, text, images, sound files, video data, or other data sets to be sent to and/or received from one or more network servers or other devices via one or more wired or wireless networks.

The memory 2320 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), BLU-RAY, or other optical storage, magnetic cassettes, magnetic tape, magnetic disk storage or other magnetic storage devices, or any other medium which can be used to store the desired information and which can be accessed by the mobile device 110.

The memory 2320 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The mobile device 110 can support one or more input devices 2330; such as a touch screen 2332; microphone 2334 for implementation of voice input for voice recognition, voice commands and the like; camera 2336; physical keyboard 2338; trackball 2340; and/or proximity sensor 2342; and one or more output devices 2350, such as a speaker 2352 and one or more displays 2354. Other input devices (not shown) using gesture recognition may also be utilized in some cases. Other possible output devices (not shown) can include piezoelectric or haptic output devices. Some devices can serve more than one input/output function. For example, touch screen 2332 and display 2354 can be combined into a single input/output device.

A wireless modem 2360 can be coupled to an antenna (not shown) and can support two-way communications between the processor 2310 and external devices, as is well understood in the art. The modem 2360 is shown generically and can include a cellular modem for communicating with the mobile communication network 2304 and/or other radio-based modems (e.g., Bluetooth 2364 or Wi-Fi 2362). The wireless modem 2360 is typically configured for communication with one or more cellular networks, such as a GSM network for data and voice communications within a single cellular network, between cellular networks, or between the mobile device and a public switched telephone network (PSTN).

The mobile device can further include at least one input/output port 2380, a power supply 2382, a satellite navigation system receiver 2384, such as a Global Positioning System (GPS) receiver, an accelerometer 2386, a gyroscope (not shown), and/or a physical connector 2390, which can be a USB port, IEEE 1394 (FireWire) port, and/or an RS-232 port. The illustrated components 2302 are not required or all-inclusive, as any components can be deleted and other components can be added.

Based on the foregoing, it should be appreciated that technologies for tunneling VoIP call control on cellular networks have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more computer-readable memories containing instructions which, when executed by one or more processors disposed in an electronic device, implement multi-party call control in a hybrid telecommunications network having a cellular voice access network and a VoIP (Voice over Internet Protocol) core network, comprising:
  making, at the VoIP core network, a connection to a first remote party in a first call between a user on a mobile device and the first remote party, the mobile device accessing the VoIP core network through the cellular voice access network in an original call session;
  receiving, at the VoIP core network, a request for a first new call session from the cellular voice access network to make a connection for a second call to a second remote party, the request including a caller-ID for the second remote party, the cellular voice access network placing the first call on hold when making the request;
  when the VoIP network identifies the caller-ID for the second remote party, releasing, at the VoIP core network, the first new call session so that the cellular voice access network un-holds the first call and restores the original call session between the user on the mobile device and the first remote party;
  when the original call session is restored at the VoIP core network, placing, at the VoIP core network and using the restored original call session, the first call on hold and making the connection for the second call to the second remote party so that a single call session is implemented in the cellular voice access network and audio from the second call to the second remote party is flowing over the single call session to the mobile device;
  receiving, from the cellular voice access network and at the VoIP core network, a second request for a second new call session, the second request including a caller-ID identifying a designated called party number;
  interpreting the designated called party number in the second request as a call control signal from the mobile device; and
  when the VoIP network receives the caller-ID for the designated called party number, releasing, at the VoIP network, the second new call session before establishing audio flow between the mobile device and the VoIP core network.

2. The one or more computer-readable memories of claim 1 further comprising
  holding call state for two legs in the VoIP core network, one of the legs comprising the connection to the first remote party and the other of the legs comprising the connection to the second remote party.

3. The one or more computer-readable memories of claim 1 further comprising
  using the call control signal as a bridging instruction from the user of the mobile device.

4. The one or more computer-readable memories of claim 1 further comprising
  bridging the connection to the first remote party to the connection to the second remote party on the original call session to thereby establish a three-way call.

5. A method for implementing call waiting in a mobile device on a hybrid telecommunications network having a cellular voice access network and a VoIP (Voice over Internet Protocol) core network, comprising:
  making, at the VoIP core network, a connection to a first remote party in a first call between a user on a mobile device and the first remote party, the mobile device accessing the VoIP core network through the cellular voice access network in an original call session;
  receiving a second call at the VoIP core network from a second remote party;
  when the second call is received at the VoIP core network, originating, at the VoIP core network, a new call session with the cellular voice access network so that the cellular voice access network signals to the mobile device of a call waiting status for the second call;
  when the cellular voice access network signals to the mobile device of the call waiting status, releasing, at the VoIP core network, the new call session before establishing audio flow between the mobile device and the VoIP core network;
  receiving, from the cellular voice access network and at the VoIP core network, a request for a second new call session, the request including a caller-ID identifying a designated called party number; and
  when the VoIP core network receives the request for the second new call session, interpreting, at the VoIP core network, the designated called party number as a call control signal from the mobile device, the call control signal indicating that the second call is to be answered at the mobile device.

6. The method of claim 5 further comprising
  placing the first call on hold in the VoIP network and connecting the second call to the original call session so that audio from the second remote party is flowing to the mobile device.

7. The method of claim 5 further comprising
  interpreting the call control signal as a flash signal.

8. A mobile device usable with a hybrid telecommunications network having a cellular voice access network and a VoIP (Voice over Internet Protocol) core network, comprising:
  one or more processors; and
  one or more computer-readable memories storing instructions which, when executed by the processors, implement signaling through a cellular voice access network by causing the device to
    originate a first call to a first remote party through the cellular voice access network, the mobile device accessing the VoIP core network through the cellular voice access network in an original call session,
    when the first call is originated, originate, at the VoIP core network, a second call to a second remote party through the cellular voice access network,
    when the second call is originated, originate, at the VoIP core network, a third call using a designated called party number through the cellular voice access network, the designated called party number being exposed to the VoIP core network in a caller-ID passed from the cellular voice access network, the designated called party number encoding a call control signal that is interpreted by the VoIP core network as a bridging instruction so that the first call and second call are bridged using the original call session between the mobile device and the first remote party, wherein the VoIP core network interprets the call control signal after the VoIP core network receives the designated called party number from the cellular voice access network, and
    when the VoIP core network interprets the call control signal, facilitate, at the VoIP core network, a three-way call for a user on the mobile device with the first remote party and the second remote party,
      wherein the mobile device is configured to originate the third call to the cellular voice access network before establishing audio flow between the mobile device and the cellular voice access network.

9. A mobile device usable with a hybrid telecommunications network having a cellular voice access network and a VoIP (Voice over Internet Protocol) core network, comprising:
  one or more processors; and
  one or more computer-readable memories storing instructions which, when executed by the processors, implement signaling through a cellular voice access network by causing the mobile device to
    originate a first call to a first remote party through the cellular voice access network, the mobile device accessing the VoIP core network through the cellular voice access network in an original call session,
    when the first call is originated, receive an indication from the cellular voice access network of a second call waiting,
    when the mobile device receives the indication of the second call waiting, originate a third call using a designated called party number through the cellular voice access network, the designated called party number being exposed to the VoIP core network in a caller-ID passed from the cellular voice access network, the designated called party number encoding a call control signal that indicates a flash instruction so that the first call is placed on hold in the VoIP network and a second call is connected to the mobile device using the original call session, wherein the VoIP core network interprets the call control signal after being exposed to the designated called party number from the cellular voice access network, and the VoIP core network places the first call on hold and connects the second call to the mobile device after interpreting the designated called party number; and
    facilitate switching a user on the mobile device between the first remote party and the second remote party using subsequent encoded call control signals, wherein the mobile device is configured to originate the third call to the cellular voice access network before establishing audio flow between the mobile device and the cellular voice access network.

10. The mobile device of claim 9 in which the encoded call control signal is passed transparently through the cellular voice access network.

11. The mobile device of claim 9 in which the designated called party number is associated by the cellular voice access network with the VoIP core network.

12. The mobile device of claim 9 in which the designated called party number is not normally routable.

13. The mobile device of claim 9 in which a call session used to provide the designated called party number in the caller-ID is released after the caller-ID is read by the VoIP core network.

14. A method for explicitly communicating call termination from a mobile device to a VoIP (Voice over Internet Protocol) core network through a cellular voice access network, comprising:
  originating a call to a remote party through the cellular voice access network, the VoIP core network providing a connection to the remote party;
  receiving, at the VoIP core network, an input from a user of the mobile device indicating a termination of the call to the remote party;
  when the VoIP core network receives the input to terminate the call to the remote party, originating, at the VoIP core network, a new call to the cellular voice access network using a designated called party number to encode a call control signal;
  when the new call is originated using the designated called party number, the cellular voice access network creating a new call session that is passed to the VoIP core network with a caller-ID, the caller-ID identifying the designated called party number to the VoIP core network;
  when the VoIP core network receives the passed caller-ID identifying the designated called party number, interpreting, at the VoIP core network, the designated called party number as a call control signal from the mobile device and terminating the connection to the remote party in response to the call control signal; and
  terminating the call to the remote party at the mobile device in response to the user input,
    wherein the mobile device is configured to originate the new call to the cellular voice access network before establishing audio flow between the mobile device and the cellular voice access network.

15. The method of claim 14 further comprising originating or receiving a second call with a second remote party so that multiple calls are being handled by the mobile device simultaneously and terminating the second call in response to the received call control signal.

16. The method of claim 15 further comprising leaving the call up on the VoIP network if the call control signal is not received during a predetermined time interval.

17. The method of claim 15 in which the mobile device identifies itself to the cellular voice access network as a mobile device for which originated calls to the cellular voice access network are passed to the VoIP core network for handling.

18. The method of claim 14 further comprising, if the call control signal is not received by the VoIP core network, playing an audible tone to the remote party to indicate that a reconnection to the local party will be attempted.

* * * * *